US012659776B2

(12) United States Patent
Bai et al.

(10) Patent No.: US 12,659,776 B2
(45) Date of Patent: Jun. 16, 2026

(54) BEAM REPORT ENHANCEMENTS FOR BEAM PREDICTION

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Hua Wang, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 953 days.

(21) Appl. No.: 17/832,073

(22) Filed: Jun. 3, 2022

(65) Prior Publication Data

US 2023/0397029 A1 Dec. 7, 2023

(51) Int. Cl.
*G01R 31/08* (2020.01)
*G06F 11/00* (2006.01)
(Continued)

(52) U.S. Cl.
CPC .......... *H04W 24/10* (2013.01); *H04B 7/0617* (2013.01); *H04B 7/0639* (2013.01); *H04L 5/0048* (2013.01)

(58) Field of Classification Search
CPC .................. H04W 24/10; H04W 52/0229; H04B 7/0617; H04B 7/0639; H04B 7/063; H04B 7/0656; H04L 5/0048
See application file for complete search history.

(56) References Cited

U.S. PATENT DOCUMENTS

| | | | | |
|---|---|---|---|---|
| 10,666,342 | B1 * | 5/2020 | Landis | ................... G06N 3/045 |
| 2019/0199496 | A1 * | 6/2019 | Qin | ...................... H04W 16/28 |

(Continued)

FOREIGN PATENT DOCUMENTS

WO WO-2020144624 A1 7/2020

OTHER PUBLICATIONS

Lee J.H., et al., "Unified Codebook Design for Vector Channel Quantization in MIMO Broadcast Channels", IEEE Transactions on Signal Processing, USA, vol. 63, No. 10, May 1, 2015, pp. 2509-2519, XP011578292, DOI:10.1109/TSP.2015.2414895, p. 2516, right-hand column—p. 2517, left-hand column.

(Continued)

*Primary Examiner* — Edan Orgad
*Assistant Examiner* — Hidayat Dabiri
(74) *Attorney, Agent, or Firm* — Holland & Hart LLP

(57) ABSTRACT

Methods, systems, and devices for wireless communications are described. A user equipment (UE) may receive control signaling identifying, for multiple beams, a set of quantized values for beam measurement reporting. The UE may receive a set of reference signals and each reference signal may be associated with a beam of the multiple beams. The UE may transmit a report indicating a set of power values that are based on the set of quantized values and the set of reference signals. Each power value of the set of power values may be associated with a respective beam of the multiple beams. The control signaling may also indicate a set of rules for vector-based beam management reporting for the multiple beams. The report may include a vector report and may indicate the set of power values based on the set of rules and the set of reference signals.

24 Claims, 12 Drawing Sheets

(51) Int. Cl.

| | |
|---|---|
| *G08C 15/00* | (2006.01) |
| *H04B 7/06* | (2006.01) |
| *H04J 1/16* | (2006.01) |
| *H04J 3/14* | (2006.01) |
| *H04L 1/00* | (2006.01) |
| *H04L 5/00* | (2006.01) |
| *H04W 24/10* | (2009.01) |

(56) References Cited

U.S. PATENT DOCUMENTS

| | | | | |
|---|---|---|---|---|
| 2020/0015228 | A1 | 1/2020 | Kang et al. | |
| 2020/0134461 | A1* | 4/2020 | Chai | G06N 3/084 |
| 2020/0336194 | A1* | 10/2020 | Karjalainen | H04B 7/0695 |
| 2020/0367083 | A1* | 11/2020 | Hao | H04B 7/0695 |
| 2021/0028832 | A1* | 1/2021 | Liu | H04B 7/0617 |
| 2021/0143879 | A1* | 5/2021 | Ji | H04B 7/0486 |
| 2022/0271802 | A1* | 8/2022 | Lee | H04B 17/11 |
| 2024/0056844 | A1* | 2/2024 | Zhu | H04W 16/28 |
| 2025/0125819 | A1* | 4/2025 | Venkatesan | H03M 13/6577 |

OTHER PUBLICATIONS

Partial International Search Report—PCT/US2023/066759—ISA/EPO—Sep. 1, 2023.
International Search Report and Written Opinion—PCT/US2023/066759—ISA/EPO—Oct. 23, 2023.

* cited by examiner

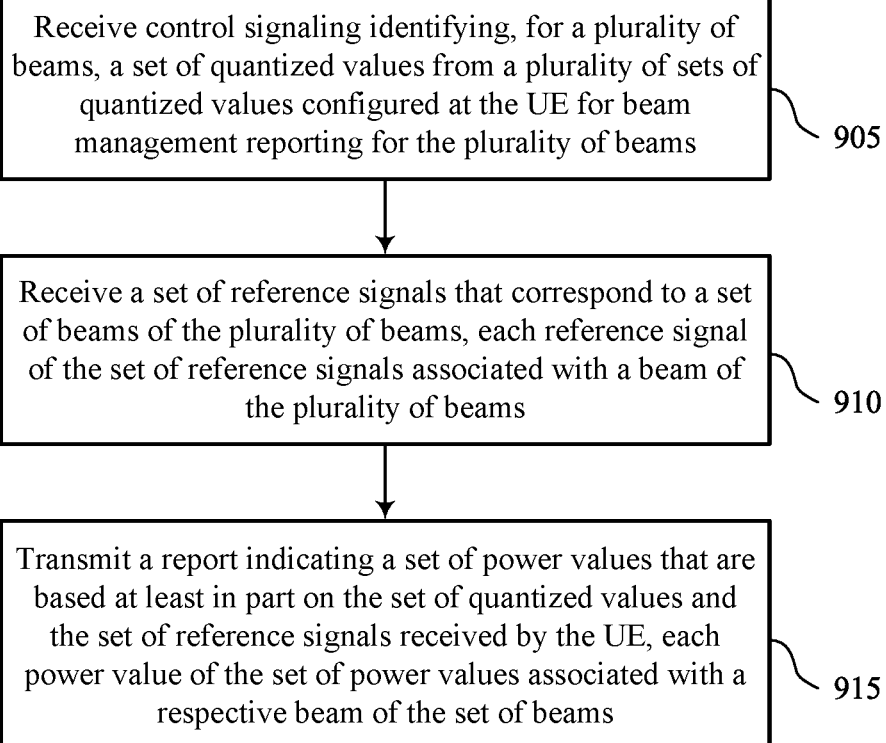

Receive control signaling identifying, for a plurality of beams, a set of quantized values from a plurality of sets of quantized values configured at the UE for beam management reporting for the plurality of beams
905

Receive a set of reference signals that correspond to a set of beams of the plurality of beams, each reference signal of the set of reference signals associated with a beam of the plurality of beams
910

Transmit a report indicating a set of power values that are based at least in part on the set of quantized values and the set of reference signals received by the UE, each power value of the set of power values associated with a respective beam of the set of beams
915

Figure 10:
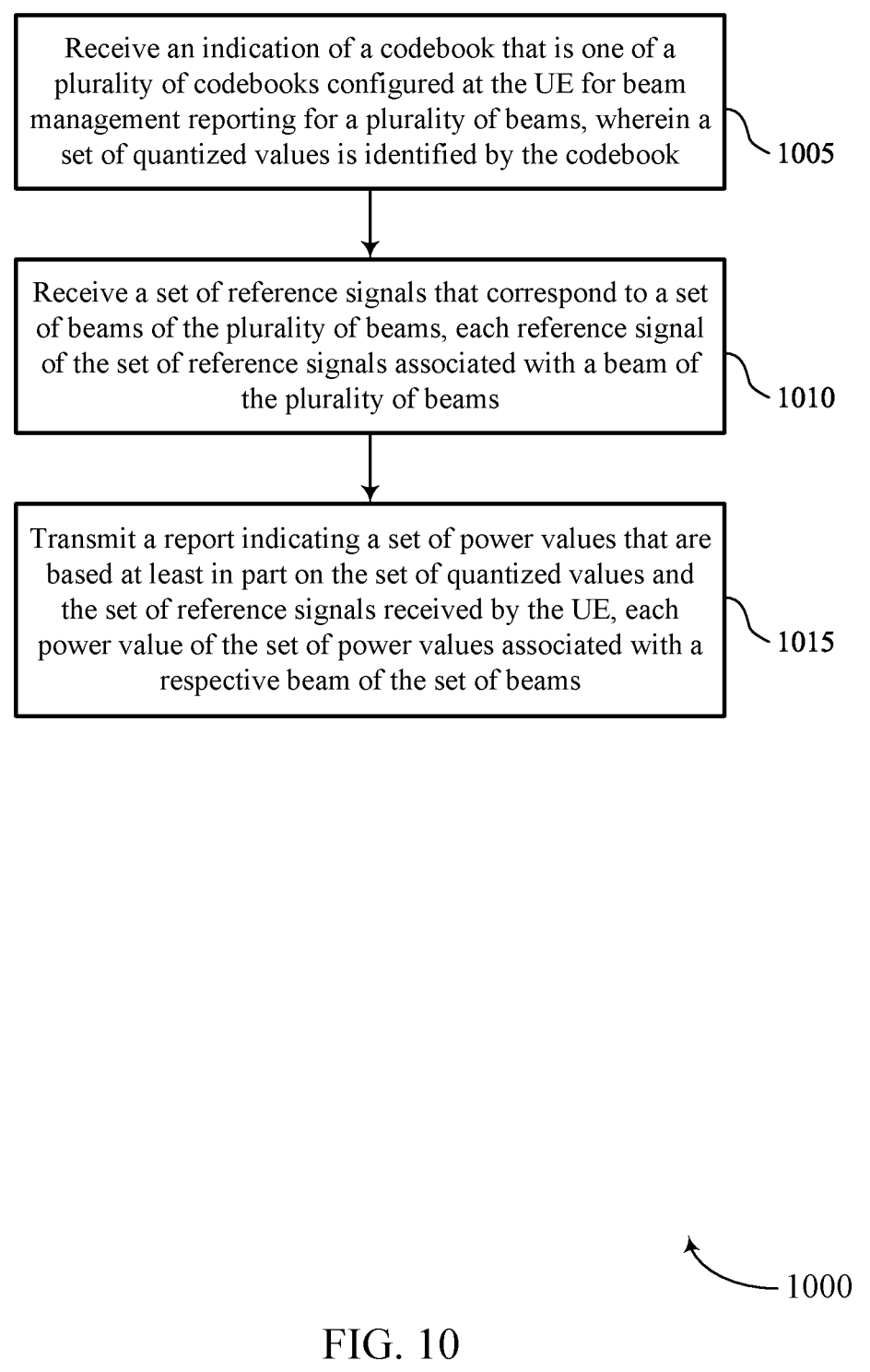

Receive an indication of a codebook that is one of a plurality of codebooks configured at the UE for beam management reporting for a plurality of beams, wherein a set of quantized values is identified by the codebook

1005

Receive a set of reference signals that correspond to a set of beams of the plurality of beams, each reference signal of the set of reference signals associated with a beam of the plurality of beams

1010

Transmit a report indicating a set of power values that are based at least in part on the set of quantized values and the set of reference signals received by the UE, each power value of the set of power values associated with a respective beam of the set of beams

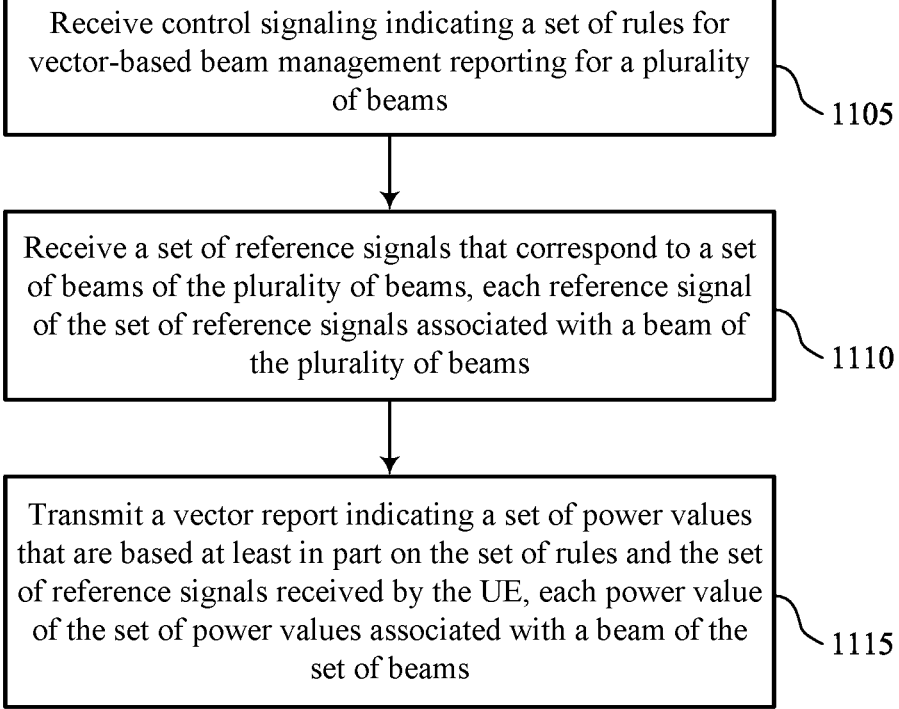

Receive control signaling indicating a set of rules for vector-based beam management reporting for a plurality of beams

1105

Receive a set of reference signals that correspond to a set of beams of the plurality of beams, each reference signal of the set of reference signals associated with a beam of the plurality of beams

1110

Transmit a vector report indicating a set of power values that are based at least in part on the set of rules and the set of reference signals received by the UE, each power value of the set of power values associated with a beam of the set of beams

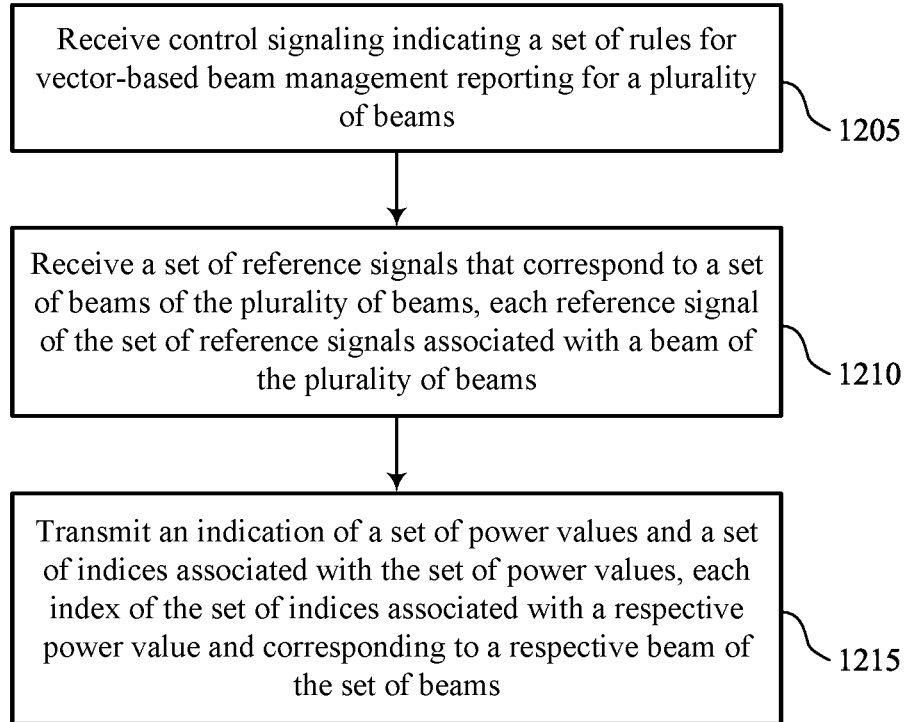

Receive control signaling indicating a set of rules for vector-based beam management reporting for a plurality of beams

1205

Receive a set of reference signals that correspond to a set of beams of the plurality of beams, each reference signal of the set of reference signals associated with a beam of the plurality of beams

1210

Transmit an indication of a set of power values and a set of indices associated with the set of power values, each index of the set of indices associated with a respective power value and corresponding to a respective beam of the set of beams

BEAM REPORT ENHANCEMENTS FOR BEAM PREDICTION

FIELD OF TECHNOLOGY

The present disclosure relates to wireless communications, including beam report enhancements for beam prediction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network nodes, each supporting wireless communication for communication devices, which may be known as user equipment (UE). In some wireless communications systems, a network node may use machine learning models for beam management. In some cases, existing techniques for beam management using machine learning models may be deficient.

SUMMARY

The described techniques relate to improved methods, systems, devices, and apparatuses that support beam report enhancements for beam prediction. For example, the described techniques provide a format for reference signal measurement reporting that supports machine learning models at a network node. In some examples, a user equipment (UE) may receive control signaling identifying, for multiple beams, a set of quantized values from a multiple sets of quantized values configured at the UE for beam measurement reporting for the multiple beams. The UE may receive a set of reference signals that correspond to a set of beams of the multiple beams and each reference signal of the set of reference signals may be associated with a beam of the plurality of beams. The UE may transmit a report indicating a set of power values that are based on the set of quantized values and the set of reference signals received by the UE. Each power value of the set of power values may be associated with a respective beam of the set of beams. In some examples, the control signaling may indicate a set of rules for vector-based beam management reporting for the multiple beams. In such examples, the report may include a vector report and may indicate the set of power values based on the set of rules and the set of reference signals received by the UE. In some examples, such techniques for beam report enhancements for beam prediction may reduce network inefficiencies, among other possible benefits.

A method for wireless communication at a UE is described. The method may include receiving control signaling identifying, for a set of multiple beams, a set of quantized values from a set of multiple sets of quantized values configured at the UE for beam management reporting for the set of multiple beams, receiving a set of reference signals that correspond to a set of beams of the set of multiple beams, each reference signal of the set of reference signals associated with a beam of the set of multiple beams, and transmitting a report indicating a set of power values that are based on the set of quantized values and the set of reference signals received by the UE, each power value of the set of power values associated with a respective beam of the set of beams.

An apparatus for wireless communication at a UE is described. The apparatus may include a processor, memory coupled with the processor, and instructions stored in the memory. The instructions may be executable by the processor to cause the apparatus to receive control signaling identifying, for a set of multiple beams, a set of quantized values from a set of multiple sets of quantized values configured at the UE for beam management reporting for the set of multiple beams, receive a set of reference signals that correspond to a set of beams of the set of multiple beams, each reference signal of the set of reference signals associated with a beam of the set of multiple beams, and transmit a report indicating a set of power values that are based on the set of quantized values and the set of reference signals received by the UE, each power value of the set of power values associated with a respective beam of the set of beams.

Another apparatus for wireless communication at a UE is described. The apparatus may include means for receiving control signaling identifying, for a set of multiple beams, a set of quantized values from a set of multiple sets of quantized values configured at the UE for beam management reporting for the set of multiple beams, means for receiving a set of reference signals that correspond to a set of beams of the set of multiple beams, each reference signal of the set of reference signals associated with a beam of the set of multiple beams, and means for transmitting a report indicating a set of power values that are based on the set of quantized values and the set of reference signals received by the UE, each power value of the set of power values associated with a respective beam of the set of beams.

A non-transitory computer-readable medium storing code for wireless communication at a UE is described. The code may include instructions executable by a processor to receive control signaling identifying, for a set of multiple beams, a set of quantized values from a set of multiple sets of quantized values configured at the UE for beam management reporting for the set of multiple beams, receive a set of reference signals that correspond to a set of beams of the set of multiple beams, each reference signal of the set of reference signals associated with a beam of the set of multiple beams, and transmit a report indicating a set of power values that are based on the set of quantized values and the set of reference signals received by the UE, each power value of the set of power values associated with a respective beam of the set of beams.

In some examples of the method, apparatuses, and non-transitory computer-readable medium described herein, receiving the control signaling identifying the set of quantized values may include operations, features, means, or instructions for receiving an indication of a codebook that may be one of a set of multiple codebooks configured at the UE for beam management reporting for the set of multiple beams, where the set of quantized values may be identified by the codebook.

In some examples of the method, apparatuses, and non-transitory computer-readable medium described herein, receiving the control signaling identifying the set of quantized values may include operations, features, means, or instructions for receiving an indication activating a report configuration associated with the set of quantized values, where the set of quantized values may be identified by the report configuration.

Some examples of the method, apparatuses, and non-transitory computer-readable medium described herein may further include operations, features, means, or instructions for transmitting second control signaling indicating a set of quantized values identified by the UE, where receiving the control signaling may be based on the second control signaling.

In some examples of the method, apparatuses, and non-transitory computer-readable medium described herein, the set of quantized values may be identified by the UE based on a measurement accuracy supported by the UE and associated with the set of power values, a power status associated with a battery at the UE, or both.

Some examples of the method, apparatuses, and non-transitory computer-readable medium described herein may further include operations, features, means, or instructions for transmitting second control signaling indicating an error value associated with the set of power values and receiving third control signaling identifying a second set of quantized values from the set of multiple sets of quantized values configured at the UE based on the indicated error value.

In some examples of the method, apparatuses, and non-transitory computer-readable medium described herein, the error value corresponds to a standard deviation of an error associated with the set of power values, an average error associated with the set of power values, an estimated error for each power value of the set of power values, or any combination thereof.

Some examples of the method, apparatuses, and non-transitory computer-readable medium described herein may further include operations, features, means, or instructions for transmitting second control signaling indicating a quantity of sets of quantized values capable of being supported at the UE and receiving third control signaling configuring the UE with the set of multiple sets of quantized values at least in part in response to the quantity of sets of quantized values capable of being supported at the UE.

Some examples of the method, apparatuses, and non-transitory computer-readable medium described herein may further include operations, features, means, or instructions for transmitting second control signaling indicating a quantization level supported at the UE, a rule for reference signal reporting supported by the UE, or both.

In some examples of the method, apparatuses, and non-transitory computer-readable medium described herein, the set of quantized values may be based on a machine learning model at a network node.

In some examples of the method, apparatuses, and non-transitory computer-readable medium described herein, the set of quantized values includes a quantization range, a quantization level, a quantity of bits, or any combination thereof.

A method for wireless communication at a UE is described. The method may include receiving control signaling indicating a set of rules for vector-based beam management reporting for a set of multiple beams, receiving a set of reference signals that correspond to a set of beams of the set of multiple beams, each reference signal of the set of reference signals associated with a beam of the set of multiple beams, and transmitting a vector report indicating a set of power values that are based on the set of rules and the set of reference signals received by the UE, each power value of the set of power values associated with a beam of the set of beams.

An apparatus for wireless communication at a UE is described. The apparatus may include a processor, memory coupled with the processor, and instructions stored in the memory. The instructions may be executable by the processor to cause the apparatus to receive control signaling indicating a set of rules for vector-based beam management reporting for a set of multiple beams, receive a set of reference signals that correspond to a set of beams of the set of multiple beams, each reference signal of the set of reference signals associated with a beam of the set of multiple beams, and transmit a vector report indicating a set of power values that are based on the set of rules and the set of reference signals received by the UE, each power value of the set of power values associated with a beam of the set of beams.

Another apparatus for wireless communication at a UE is described. The apparatus may include means for receiving control signaling indicating a set of rules for vector-based beam management reporting for a set of multiple beams, means for receiving a set of reference signals that correspond to a set of beams of the set of multiple beams, each reference signal of the set of reference signals associated with a beam of the set of multiple beams, and means for transmitting a vector report indicating a set of power values that are based on the set of rules and the set of reference signals received by the UE, each power value of the set of power values associated with a beam of the set of beams.

A non-transitory computer-readable medium storing code for wireless communication at a UE is described. The code may include instructions executable by a processor to receive control signaling indicating a set of rules for vector-based beam management reporting for a set of multiple beams, receive a set of reference signals that correspond to a set of beams of the set of multiple beams, each reference signal of the set of reference signals associated with a beam of the set of multiple beams, and transmit a vector report indicating a set of power values that are based on the set of rules and the set of reference signals received by the UE, each power value of the set of power values associated with a beam of the set of beams.

In some examples of the method, apparatuses, and non-transitory computer-readable medium described herein, transmitting the vector report may include operations, features, means, or instructions for transmitting an indication of the set of power values and a set of indices associated with the set of power values, each index of the set of indices associated with a respective power value and corresponding to a respective beam of the set of beams.

In some examples of the method, apparatuses, and non-transitory computer-readable medium described herein, the vector report may be transmitted based on determining that the UE failed to receive a reference signal associated with a beam of the set of multiple beams and an index corresponding to the beam includes a default index and a power value associated with the index includes a lowest power value of the set of power values.

Some examples of the method, apparatuses, and non-transitory computer-readable medium described herein may further include operations, features, means, or instructions for determining that the UE failed to receive a reference signal associated with a beam of the set of multiple beams and interpolating a power value corresponding to the beam based on the determination, where transmitting the vector report may be based on the interpolation.

Some examples of the method, apparatuses, and non-transitory computer-readable medium described herein may further include operations, features, means, or instructions for receiving second control signaling indicating a function to be used by the UE for interpolating power values, where the function may be based on historical power values reported by the UE, and where interpolating the power value may be based on the function.

In some examples of the method, apparatuses, and non-transitory computer-readable medium described herein, receiving the control signaling indicating the set of rules for vector-based beam management reporting may include operations, features, means, or instructions for receiving an indication of a vector report quantity, where the vector report may be transmitted based on the indicated vector report quantity.

In some examples of the method, apparatuses, and non-transitory computer-readable medium described herein, transmitting the vector report may include operations, features, means, or instructions for transmitting an indication of the set of power values and a timestamp associated with the set of power values, each power value of the set of power values corresponding to a respective time instance prior to a time instance of the timestamp.

In some examples of the method, apparatuses, and non-transitory computer-readable medium described herein, the control signaling further indicates a quantity of measurements associated with the timestamp and the set of power values may be based on the indicated quantity.

Some examples of the method, apparatuses, and non-transitory computer-readable medium described herein may further include operations, features, means, or instructions for receiving an indication of a format for vector-based beam management reporting, where the vector report further indicates the respective time instance of each power value of the set of power values based on the format.

In some examples of the method, apparatuses, and non-transitory computer-readable medium described herein, receiving the control signaling indicating the set of rules for vector-based beam management reporting may include operations, features, means, or instructions for receiving an indication of an ordering for the set of power values, where the vector report indicating the set of power values may be transmitted in accordance with the ordering.

In some examples of the method, apparatuses, and non-transitory computer-readable medium described herein, a first power value of the set of power values may be indicated using a first quantity of bits and a second power value of the set of power values may be indicated using a second quantity of bits based on the ordering, the first power value being greater than the second power value and the first quantity of bits being greater than the second quantity of bits.

In some examples of the method, apparatuses, and non-transitory computer-readable medium described herein, the second power value corresponds to a power value difference relative to the first power value.

In some examples of the method, apparatuses, and non-transitory computer-readable medium described herein, the vector report includes an identifier associated with the set of power values, the identifier corresponding to the set of beams.

BRIEF DESCRIPTION OF THE DRAWINGS

FIGS. 9 through 12 show flowcharts illustrating methods that support beam report enhancements for beam prediction in accordance with one or more aspects of the present disclosure.

DETAILED DESCRIPTION

Figure 1:
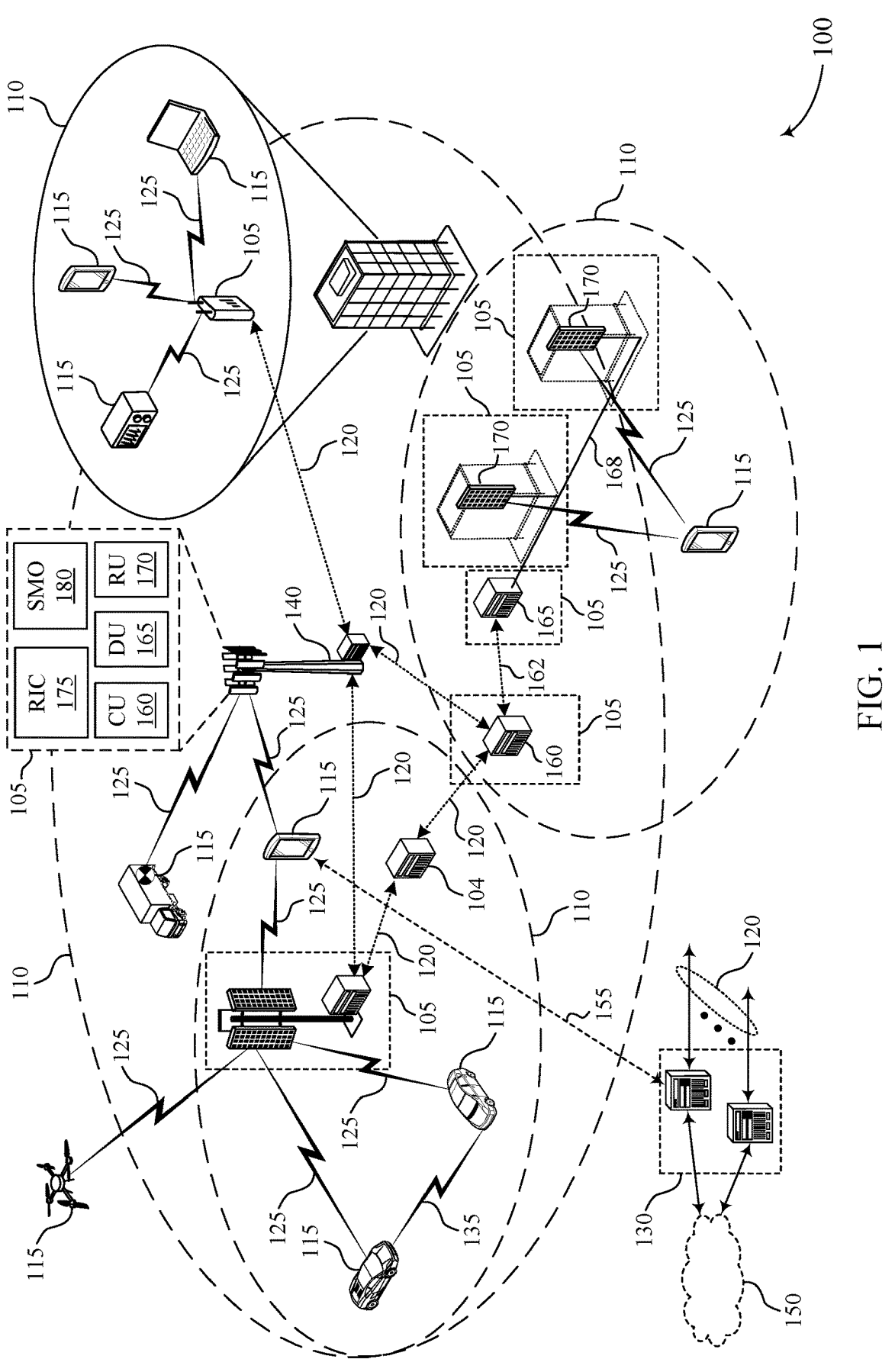
FIGS. 1 and 2 each illustrate an example of a wireless communications system that supports beam report enhance-ments for beam prediction in accordance with one or more aspects of the present disclosure.

Some wireless communications systems may support beamforming operations for directional communications. For example, wireless communication devices operating within a wireless communications system may communicate via directional transmissions (e.g., beams), in which beamforming may be applied (e.g., using one or more antenna elements) to form (e.g., select, shape, or steer) a beam in a direction. For example, a first communication device (e.g., a network entity, a network node) may apply beamforming to form one or more beams (e.g., one or more uplink receive beams or one or more downlink transmit beams) for communications with a second communication device (e.g., a user equipment (UE)). In some examples, beamforming applied by the network node may be based on measurements performed at the UE, for example on reference signals transmitting by the network node. For example, the network node may perform a beam management procedure, in which the network node may transmit multiple reference signals to the UE using multiple (e.g., different) beams and the UE may report measurements performed at the UE on the multiple reference signals.

For some beam management procedures, the network node may use one or more machine learning models to predict a suitable or compatible beam for wireless communications with the UE. For example, the network entity may configure the UE to perform and report measurements of reference signals transmitted from the network node using the multiple beams, such that the network node may use the reported measurements (e.g., reference signal measurements) as input for the one or more machine learning models. In some examples, however, a format for reference signal measurement reporting may not provide suitable or compatible input for a machine learning model. For example, the UE may be configured to report reference signal measurements with a fixed quantization error value that may exceed a beam prediction accuracy of the machine learning model.

Additionally, or alternatively, as part of the beam management procedure, the network node may indicate, to the UE, a set of the reference signals (e.g., may indicate a set of time and frequency resources during which the network node may transmit reference signals) to be used at the UE for reference signal measurement reporting. In such an example, each reference signal may be associated with a respective beam. In some examples, the UE may not be capable of reporting reference signal measurements for each reference signal of the indicated set. As such, the UE may select a subset of reference signals (e.g., from the indicated set of reference signals) to use for the reference signal measurement reporting. In some examples, however, the network node may have trained the machine learning model with the indicated set of reference signals (e.g., with measurements or other information associated with the indicated set of reference signals). In such examples, a subset of reference signal measurements (e.g., corresponding to the selected subset of reference signals) may not be sufficient (e.g., suitable, adequate, compatible) input for the machine learning model and, as such, may degrade a beam prediction accuracy of the machine learning model. Moreover, in some examples, the UE may be configured to report a single reference signal measurement (e.g., performed at a single time instance) per reference signal of the selected subset and some machine learning models may rely on multiple (e.g., a series of) reference signal measurements performed during a duration of time.

Various aspects of the present disclosure generally relate to techniques for beam report enhancements for beam prediction, and more specifically, to a format for reference signal measurement reporting that supports machine learning models at a network node. For example, the UE may be configured with multiple sets of quantization values and each set of quantization values may include a quantization range, a quantization level, or a quantity of bits, or any combination of these, to be used by the UE for reporting reference signal measurements to the network (e.g., the network node). In some examples, each set of quantization values may be represented as a codebook. For example, the UE may be configured with multiple codebooks and the network node may indicate, to the UE, which codebook may be used by the UE for reference signal measurement reporting. In some examples, the codebook indicated to the UE (e.g., from the network node) may be based on one or more machine learning models used at the network node for beam predictions or other beam management procedures.

In some examples, the network node may configure the UE to perform vector-based beam measurement reporting, in which the UE may transmit a vector report (e.g., a report formatted in vector format, including one or more vectors) associated with measurements performed using the set of reference signals (e.g., an entirety of the set of reference signals) indicated to the UE from the network node. In some examples, a vector report may include a single identifier (ID) for the set of the reference signals and, as such, may reduce overhead associated with transmitting the vector report to the network node. Additionally, or alternatively, the network node may configure the UE to perform differential vector-based measurement reporting, in which the UE may report multiple (e.g., a series) reference signal measurements performed at the UE at multiple time instances. In some examples, the multiple time instances during which the reference signal measurements are performed at the UE may be based on a timestamp (or multiple respective timestamps) indicated to the UE. In some examples, a differential vector report may indicate multiple reference signal measurements according to an ordering that may be based on the respective values (e.g., power values) measured for each reference signal of the indicated set.

Particular aspects of the subject matter described herein may be implemented to realize one or more of the following potential advantages. For example, the techniques employed by the described communication devices (e.g., the UE, the network node) may provide benefits and enhancements to the operation of the communication devices, including enabling a format for reference signal measurement reporting that supports machine learning models at a network node. In some examples, operations performed by the described communication devices may provide improvements to the reliability of communications within a wireless communications system. In some examples, the operations performed by the described communication devices to improve communication reliability within the wireless communications system may include configuring a communication device with a set of quantization values or one or more rules for vector-based beam measurement reporting (or both). In some other examples, operations performed by the described communication devices may also support increased throughput and higher data rates, among other benefits.

Aspects of the disclosure are initially described in the context of wireless communications systems. Aspects of the disclosure are further illustrated by and described with reference to process flows, apparatus diagrams, system diagrams, and flowcharts that relate to beam report enhancements for beam prediction.

FIG. 1 illustrates an example of a wireless communications system 100 that supports beam report enhancements for beam prediction in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network node, a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) within which the UEs 115 and the network entity 105 may establish one or more communication links 125. The coverage area 110 may be an example of a geographic area within which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable or compatible processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support beam report enhancements for beam prediction as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggrega- tion configuration in conjunction with component carriers operating using a licensed band (e.g., LAA). Operations using unlicensed spectrum may include downlink transmis- sions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a net- work entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Addi- tionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmit- ted to the same receiving device, and multiple-user MIMO (MU-MIMO), for which multiple spatial layers are trans- mitted to multiple devices.

Beamforming, which may also be referred to as spatial filtering, directional transmission, or directional reception, is a signal processing technique that may be used at a trans- mitting device or a receiving device (e.g., a network entity 105, a UE 115) to shape or steer an antenna beam (e.g., a transmit beam, a receive beam) along a spatial path between the transmitting device and the receiving device. Beamform- ing may be achieved by combining the signals communi- cated via antenna elements of an antenna array such that some signals propagating along particular orientations with respect to an antenna array experience constructive interfer- ence while others experience destructive interference. The adjustment of signals communicated via the antenna ele- ments may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., syn- chronization signals, reference signals, beam selection sig- nals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmit- ting device (e.g., a transmitting network entity 105, a transmitting UE 115) along a single beam direction (e.g., a direction associated with the receiving device, such as a receiving network entity 105 or a receiving UE 115). In some examples, the beam direction associated with trans- missions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combi- nation of digital precoding or beamforming to generate a combined beam for transmission (e.g., from a network entity 105 to a UE 115). The UE 115 may report feedback that indicates precoding weights for one or more beam direc- tions, and the feedback may correspond to a configured set of beams across a system bandwidth or one or more sub- bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi- panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform recep- tion operations in accordance with multiple receive configu- rations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may support techniques that provide a format for reference signal measurement reporting that supports machine learning models at a network node (e.g., a network entity 105 or one or more other network nodes). For example, the UE 115 may receive control signaling identifying, for multiple beams, a set of quantized values for beam management reporting for the multiple beams. The UE 115 may receive a set of reference signals that correspond to a set of beams of the multiple beams. For example, each reference signal of the set of reference signals may be associated with a beam of the multiple beams. The UE 115 may transmit a report indicating a set of power values that are based on the set of quantized values and the set of reference signals received by the UE 115. For example, each power value may be based on one or more measurements performed at the UE on a respective reference signal. As such, each power value of the set may be associated with a respective beam of the set of beams. In some examples, the control signaling may indicate a set of rules for vector-based beam management reporting for the multiple beams. In such examples, the report may include a vector report and the indicated set of power values may be based on the set of rules and the set of reference signals received by the UE 115. In some examples, reporting measurements of reference signals transmitted from the network node (e.g., reporting reference signal measurements) in accordance with the format that supports machine learning models at the network node may improve wireless communications between the UE 115 and the network node, among other possible benefits.

Figure 2:
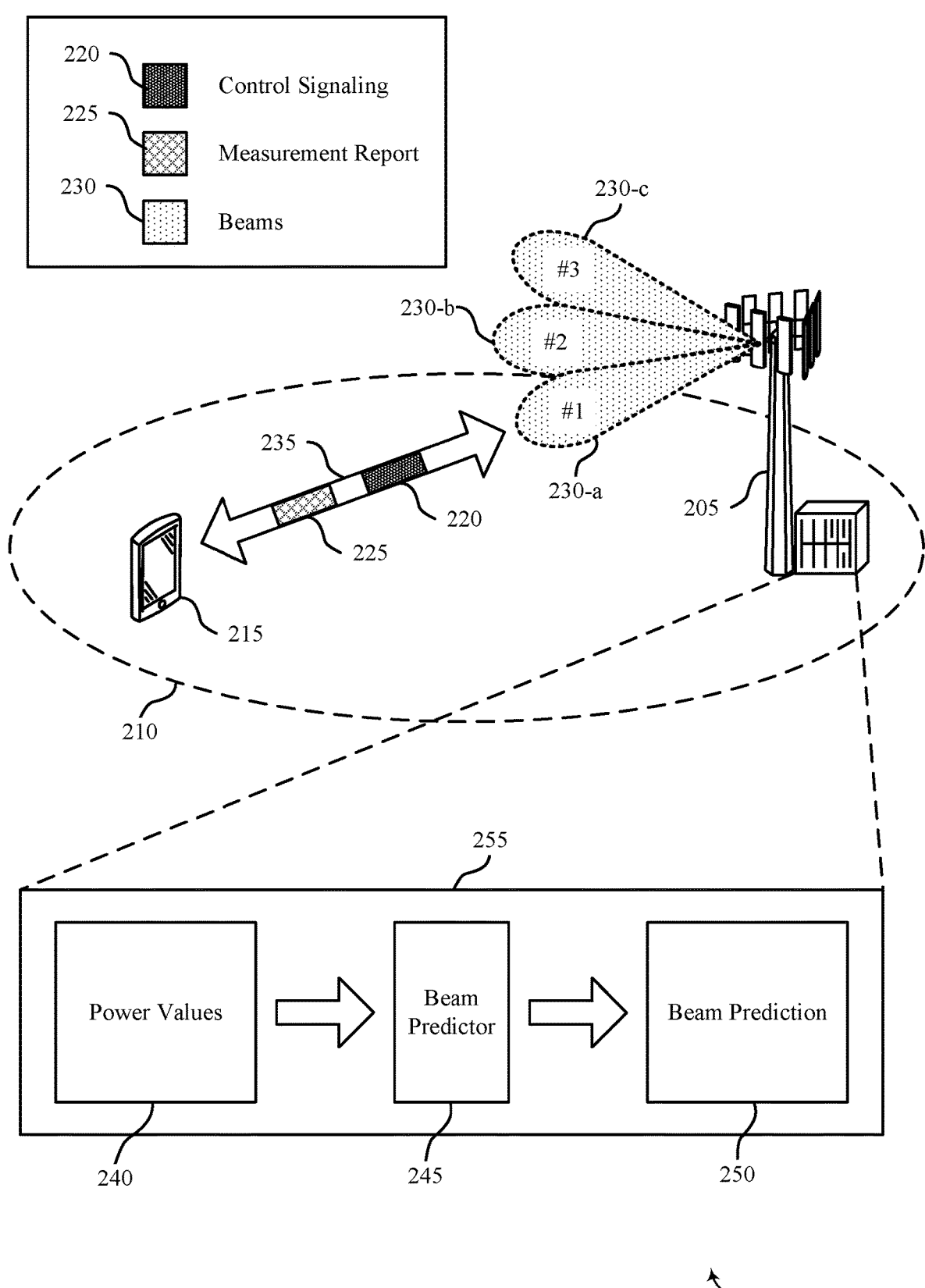

FIG. 2 illustrates an example of a wireless communications system 200 that supports beam report enhancements for beam prediction in accordance with one or more aspects of the present disclosure. In some examples, the wireless communications system 200 may implement or be implemented by one or more aspects of the wireless communications system 100. For example, the wireless communications system 200 may include a UE 215, which may be an example of a UE 115 described with reference to FIG. 1. The wireless communications system 200 may also include a network node 205, which may be an example of one or more network entities 105 (e.g., a CU, a DU, an RU, a base station, an IAB node, a TRP, or one or more other network nodes) as described with reference to FIG. 1. The network node 205 and the UE 215 may communicate within a coverage area 210, which may be an example of a coverage area 110 as described with reference to FIG. 1. In some examples, the network node 205 and the UE 215 may communicate within the coverage area 210 using a communication link 235, which may be an example of a communication link 125 as described with reference to FIG. 1. In the example of FIG. 2, the communication link 135 may be an example of an uplink, a downlink, or some other communication link that supports wired or wireless communications between the UE 215 and the network node 205. In some examples, the wireless communications system 200 may be an example of a RAN and may include features for improved communications between the UE 215 and the network node 205, among other possible benefits.

In some examples, the network node 205 may support one or more beam management procedures, in which the network node 205 may transmit multiple reference signals to the UE 215 using multiple (e.g., different) beams. In response, the UE 215 may report measurements (e.g., reference signal received power (RSRP) measurements or signal-to-interference-plus-noise (SINR) measurements) performed at the UE 215 on the multiple reference signals. For example, the network node 205 may perform beam sweeping, such as synchronization signal block (SSB) beam sweeping or CSI-RS beam sweeping, in which the network node 205 may transmit multiple reference signals (e.g., SSBs or CSI-RSs) in multiple beam forming directions (e.g., using different beams). In such an example, the UE 215 may be configured to perform measurements (e.g., RSRP measurements or SINR measurements) and report the measurements to the network entity (e.g., via a RSRP beam report or an SINR beam report). In some examples, the measurements (e.g., the reference signal measurements) may be L1 measurements (e.g., L1-RSRP measurements or L1-SINR measurements) that may be reported using an L1 report (e.g., an L-RSRP beam report or an L1-SINR beam report).

In some examples, the network node 205 may use the reported measurements as input for one or more machine learning models at the network node 205. For example, the network node 205 may use one or more machine learning models to improve beam management procedures at the network node 205. The machine learning models may be used for beam predictions (e.g., in the time domain, the spatial domain, or both) to improve beam selection accuracy and to reduce overhead and latency associated with a beam prediction procedure 255. For example, as illustrated in the example of FIG. 2, the network node 205 may transmit reference signals to the UE 215 using one or more beams 230 and, in response, the UE 215 may transmit a measurement report 225 to the network node 205. The measurement report 225 may include power values 240 (e.g., RSRP values, SINR values) associated with the reference signals transmitted from the network node 205 using one or more of the beams 230. The network node 205 may use the power values 240 as input for a beam predictor 245 (e.g., including a machine learning model) and the beam predictor 245 may output a beam prediction 250.

In some examples, the machine learning model may include one or more neural network functions (NNFs), which may be an example of a function (e.g., of the form Y=F(X)) that may be supported by a neural network model. Some examples of neural network models (e.g., neural networks) may include recurrent neural networks (RNNs), convolutional neural networks (CNNs), deep neural networks (deep-NNs), long short-term memory (LSTMs) neural networks, or gated recurrent unit (GRU) neural networks, among other examples. Each NNF may be identified by an NNF ID, which may be configured at the network node 205, or the UE 215, or both (e.g., for some types of extensions). In some examples, the input (X) and the output (Y) for each NFF may also be configured. For example, information elements (IEs) may be used to indicate the input (X) and the output (Y) for each NFF. In some examples, such IEs may be used (e.g., flexibly) by the network node 205 (or the UE 215) based on implementations of the respective communication devices. Additionally, or alternatively, an NNF may be supported by multiple neural network models (e.g., based on one or more implementations). In some examples, a neural network model may include a model structure and a parameter set. A model structure may be identified by a model ID (e.g., including a default parameter set or another parameter set), that may be associated with an NFF. In some examples, a parameter set may include weights (e.g., coefficients) of the neural network model, among other configuration parameters. Additionally, or alternatively, a parameter set may be based on a location or a configuration associated with the neural network model.

In some examples, the network node 205 may train a machine learning model (e.g., an algorithm) to predict a power value of a beam (or a set of multiple beams) at a future time instance (e.g., a future RSRP value, a future SINR value). For example, the network node 205 may use the machine learning model to predict a power value of signals transmitted using one or more of the beams (e.g., one or more of the beams 230 or other beams) at a future time instance based on historical measurements (e.g., previously measured RSRP values, previously measured SINR values) of signals transmitted using the beam 230. In such examples, an input value (e.g., a measured RSRP value, a measured SINR value) for the machine learning model may be associated with a time instance (e.g., a previous time instance, a past time instance, time instances prior to performing the beam prediction using the machine learning model). For example, an input value (X) may be described in accordance with Equation 1:

$$X[k:(k+1-n)]. \qquad (1)$$

in which n may represent a quantity of measurements (e.g., historical measurements, measurements performed during the previous time instances) and k may represent an index for the time instance associated with each measurement. Accordingly, input values (e.g., measured RSRP values, measured SINR values) for a first beam set (e.g., including a beam 230-$a$ corresponding to index #1, a beam 230-$b$ corresponding to index #2, and a beam 230-$c$ corresponding to index #3) may be formatted in accordance with the data structure of the following Table 1:

TABLE 1

| Time | Beam #1 | Beam #2 | Beam #3 |
|---|---|---|---|
| k + 1 − n | — | — | — |
| . | . | . | . |
| . | . | . | . |
| . | . | . | . |
| k − 1 | — | — | — |
| k | — | — | — |

In such examples, an output value (e.g., a predicted RSRP value, a predicted SINR value) of the machine learning model may be associated with a future time instance (or a current time instance, a time instance subsequent to the time instances of associated with the input values). For example, an output value ($\hat{Y}$) may be described in accordance with Equation 2:

$$\hat{Y}[(k+1)]. \qquad (2)$$

Accordingly, output values (e.g., predicted RSRP values, predicted SINR values) for a second beam set (e.g., including beams correspond to indices #1' through #m') may be formatted in accordance with the data structure of the following Table 2:

TABLE 2

| Time | Beam #1' | Beam #2' | Beam #3' | . . . | Beam #m' |
|---|---|---|---|---|---|
| k + 1 | — | — | — | — | — |

As shown in Table 1 and Table 2, the first beam set (e.g., the beam 230-$a$ corresponding to index #1, the beam 230-$b$ corresponding to index #2, and the beam 230-$c$ corresponding to index #3) and the second beam set (e.g., the beams correspond to indices #1' through #m') may include the same beams, some of the same beams, or different beams (e.g., the first beam set and the second beam set may be overlapping, partially overlapping, or non-overlapping). That is, the machine learning model may use power values of measurements performed on signals transmitted using some beams to predict power values of signals transmitted using the same beams or other beams.

For example, the network node 205 may use power values measured using a subset of SSBs (or CSI-RSs) to predict power values for another set of SSBs (or CSI-RSs) at a future time instance. Additionally, or alternatively, the network node 205 may use power values measured using SSBs (e.g., transmitted using SSB beams) to predict power values for CSI-RSs (e.g., transmitted using relatively refined CSI-RS beams), such as for unicast physical downlink shared channel (PDSCH) or physical downlink control channel (PDCCH) transmissions. That is, the network node 205 may use power values of measurements performed on reference signals transmitted using relatively wide beams (e.g., SSBs transmitted using SSB beams) to predict power values for reference signals transmitted using relatively narrow beams (e.g., CSI-RSs transmitted using CSI-RS beams). Additionally, or alternatively, the output of the machine learning model may include a beam ID (e.g., a CSI-RS beam ID or an SSB beam ID) at future time instances or other related metrics at future time instances.

In some examples, machine learning models may rely on relatively infrequent measurements. As such, the network node 205 may reduce a frequency at which the network node 205 transmits reference signals (e.g., to track beams or the channel) and, as such, may reduce signaling overhead for the network node 205. Accordingly, a frequency at which the UE 215 may perform reference signal measurements and transmit feedback (e.g., a report include feedback for channel estimation or other beam management techniques at the network node 205) may be reduced, thereby reducing power consumption at the UE 215.

In some examples, the machine learning model (e.g., an algorithm) may include a recursive neural network or some other algorithm. The machine learning model (e.g., the algorithm) may be trained and maintained at the network node 205 and used (e.g., run) at the network node 205, or the UE 215, or both. In some examples, if the machine learning model is used at the UE 215, the network node 205 may configure the machine learning model at the UE 215. For example, in some deployments in which the machine learning model may be used at the network node 205, the UE 215 may transmit feedback (e.g., may feedback channel state information (CSI), transmit a CSI report), a beam report (e.g., an L1-RSRP beam report, an L1-SINR beam report), or sounding reference signals (SRSs) to the network node 205. The network node 205 may use the machine learning model based on the feedback, the beam report, or measurements performed at the network node 205 on the SRSs. In some examples, the network node 205 may use the output of the machine learning model (e.g., the beam prediction 250) for scheduling decisions. For example, the network node 205 may schedule transmissions (e.g., downlink transmissions, uplink transmissions) or select a beam for wireless communications with the UE 215 based on the beam prediction 250. In some examples, the machine learning model may be used (e.g., run) at the network node 205 based on a power level (e.g., associated with a battery at the UE 215) or computation constraints of the UE 215.

In some other deployments, the machine learning model may be used at the UE 215. In such an example, the machine learning model may be configured at the UE 215 by the network node 205. The UE 215 may use the machine learning model based on measurements performed at the UE 215 (e.g., local measurements) and signaling transmitting from the network node 205. The UE 215 may report output of the machine learning model (e.g., prediction results) based on a configuration or trigger conditions (or both). In some examples, using the machine learning model at the UE 215 may lead to reduced overhead associated with measurement reporting (e.g., due to the UE 215 performing an increased quantity of measurements relative to the network node 205). In some examples, however, using the machine learning model at the UE 215 may also lead to increased computation (e.g., and power consumption) at the UE 215.

In some deployments, for example in which the machine learning model is used at the network node 205, the network node 205 may configure the UE 215 to transmit the feedback (e.g., the CSI report), or the beam report, or the SRSs, periodically, semi-persistently, aperiodically, or any combination of two or more of periodically, semi-persistently, or aperiodically. For example, the network node 205 may configure the UE 215 to transmit a CSI report based on a configuration or trigger conditions (or both). In some examples, the network node 205 may configure the UE 215 for CSI reporting via RRC signaling and may activate (or deactivate) the CSI reporting via a medium access control control element (MAC-CE). Additionally, or alternatively, the network node 205 may trigger CSI reporting at the UE 215 using a downlink control information (DCI) that may include a trigger state ID. In some examples, a CSI report configuration may indicate for the UE 215 to feedback (e.g., include in the CSI report) a particular report quantity, such as L1-RSRP or L1-SINR (or both). For example, the network node 205 may transmit an indication of one or more CSI report configurations (e.g., using a CSI-ReportConfig information element (IE)) to the UE 215 that may include a CSI report configuration ID and a report quantity (e.g., using a reportQuantity parameter of the CSI-ReportConfig IE). It is to be understood that the names of IEs and parameters described herein may change based on implementation of one or multiple devices (e.g., the UE 215, the network node 205, or both), and the examples described herein should not be considered limiting to the scope of the claims or the disclosure.

Additionally, or alternatively, the CSI report configuration (or another report configuration) may indicate whether the report is to be transmitted periodically, semi-persistently, or aperiodically, a quantity of resources to be used for transmitting the report (e.g., may indicate one or more report resources), and a set of reference signal resources to be measured at the UE 215 (e.g., a CSI-RS resource list or an SSB resource list). For example, the UE 215 may be configured with a set of multiple reference signals (e.g., CSI-RSs or SSBs) to measure and may feedback a subset of power values (e.g., up to about four L1-RSRP values or up to about four L1-SINR values) in a report. The subset of power values may correspond to a subset of the configured set of reference signals.

In some examples, the subset of reference signals for which the UE 215 may provide feedback may be selected (e.g., chosen, determined) to be included in the report at the UE 215. That is, the subset of power values may correspond to a subset of reference signals selected at the UE 215 from the configured set of reference signals. For example, the UE 215 may determine to report power values corresponding to a quantity of beams (e.g., about four) that may be associated with the largest power values (or otherwise suitable, acceptable, or compatible power values). In such an example (e.g., if the feedback corresponds to a subset of reference signals configured for the UE 215), the UE 215 may include identifiers (e.g., CSI RS IDs or SSB IDs) in the report to indicate which reference signals the reported power values correspond to. In some examples, a differential report may be used at the UE 215 for the feedback (e.g., an L1-RSRP beam report or an L1-SINR beam report). In such example, a quantity of bits (e.g., about 7) may be used to report a largest (or otherwise suitable) power value (e.g., a largest or otherwise suitable RSRP value (e.g., at or above a threshold value) or a largest or otherwise suitable SINR value (e.g., at or above a threshold value)) and another quantity of bits (e.g., about 4) may be used to indicate remaining power values. Additionally, or alternatively, the power values may be quantized in the report based on a rule that may indicate a quantization value (e.g., a quantization step of about 2 dB) for the power value (e.g., for L1-RSRP values, for L1-SINR values).

In some examples, however, such reports may not provide suitable or compatible input for machine learning models used at the network node 205. For example, some machine learning models (e.g., beam prediction algorithms) used at the network node 205 (e.g., based on power values reported from the UE 215) may rely on a particular set of beams as input. For example, the network node 205 may train the machine learning model with a quantity of beams (e.g., a quantity of measured power values that are each associated with a respective beam) that may be increased relative to quantity of power values reported from the UE 215 (e.g., the network node may train the machine learning model with more than about four beams). As such, the reported power values may not be sufficient (e.g., suitable, compatible) input for the machine learning model. Additionally, or alternatively, reporting an increased quantity of power values (e.g., to accommodate the quantity of beams used to train the machine learning model) may lead to increased overhead for the UE 215. For example, to predict power values for relatively narrow beams (e.g., CSI-RS beams), the machine learning model may rely on an increased quantity of power values measured using relatively wide beams (e.g., about 16 or about 64 SSB beams), which may lead to increased overhead associated with the measurement reporting.

In some examples, the UE 215 may be configured to report reference signal measurements with a fixed quantization error value (e.g., of about 2 dB) that may exceed a beam prediction accuracy of the machine learning model. The quantization error value (e.g., a quantization step) may depend on the prediction model (e.g., the machine learning model), or one or more capabilities of the UE 215, or both.

Additionally, or alternatively, the network node 205 may determine to perform a beam prediction (e.g., using the machine learning model) for a particular beam and may not be capable of specifying, to the UE 215, which beam (e.g., which reference signal resources, which CSI-RS, which SSB) to report (e.g., as the input of beam prediction algorithm). That is, the UE 115 may select which reference signals (e.g., of a set of configured reference signals) to include in the report irrespective of a beam for which the network node 205 may determine to perform a beam prediction.

Additionally, or alternatively, the UE 215 may be configured to report a single reference signal measurement (e.g., performed at a single time instance) per beam (e.g., associated with a respective reference signal of the selected subset of reference signals) and some machine learning models may rely on multiple (e.g., a series or) reference signal measurements performed during a duration of time. That is, the UE 215 may be capable of reporting power values measured during a single report occasion (e.g., an RSRP value measured relatively recently), however, for time-domain beam prediction algorithms, the input of the machine learning model may include the multiple power values measured at multiple time instances (e.g., may include a time series of past RSRP measurements). Additionally, or alternatively, a beam report transmitted from the UE 215 may not be transmitted (e.g., may be skipped) from the UE 215 (e.g., due to the UE 215 transmitting relatively higher priority uplink control information during a same time instance). That is, the UE 215 may refrain from performing a measurement on a reference signal during a time instance, such that the UE 215 may transmit uplink control information during the time instance. In such an example, a power value for the reference signal may be unavailable to the UE 215. That is, the UE 215 may not be capable of reporting power values unavailable to the UE 215 (e.g., due to the UE refraining from performing measurements on the reference signal) in a report transmitted from the UE 215 at a subsequent occasion. As such, the power values obtained at the network node 205 (e.g., using the report) may not be suitable (e.g., compatible) input (e.g., may not include a series of power values measured during multiple time instances) for a future beam prediction using the machine learning model (e.g., the beam prediction algorithm). As such, techniques which enable the UE 215 to report multiple power values of a same beam (e.g., past RSRP values corresponding to different measurement time instances) in a single report occasion may reduce a quantity of report occasions and provide one or more benefits for beam predictions using machine learning models.

In some examples, techniques for beam report enhancements for beam prediction, as described herein, may provide one or more benefits for beam predictions using machine learning models. In some examples, such techniques may support a framework for beam management using machine learning models (e.g., artificial intelligence). For example, beam report enhancements for beam prediction, as described herein, may support terminology, capability indication, configuration procedures (e.g., training and inference procedures), validation and testing procedures, and management of data and machine learning models (e.g., artificial intelligence models) for beam management within the wireless communications system 200. In some examples, such techniques may provide CSI feedback enhancements (e.g., overhead reduction and improved accuracy of beam predictions) as well as positioning accuracy enhancements (e.g., for scenarios in which non-line-of-sight (NLOS) conditions may be relatively heavy).

As illustrated in the example of FIG. 2, techniques for beam report enhancements for beam prediction, as described herein, may provide one or more enhancements or benefits for beam measurement reports transmitted from the UE 215 and used at the network node 205 for beam predictions. Some enhancements may include one or more quantization tables (e.g., codebooks, quantization codebooks) for beam predictions to reduce quantization error. For example, the UE 215 may be configured with multiple sets of quantization values (e.g., quantization codebooks, quantization tables) and the network node 205 may indicate to the UE 215 to use one or more sets of quantization values based on a machine learning model used at the network node 205 for beam predictions (e.g., based on beam prediction algorithm constraints). Additionally, or alternatively, some enhancements may include vector-based reporting of power values (e.g., RSRP values, SINR values) for configured reference signals (e.g., all configured CSI-RS or all configured SSBs). In some examples, the vector-based report may exclude reference signal IDs (e.g., CSI-RS IDs or SSB IDs) associated with the reported measurements (e.g., reported power values), which may lead to reduced overhead (e.g., may reduce the quantity of bits included in the report by up to about 6 bit per reference signal).

Additionally, or alternatively, techniques for beam report enhancements for beam prediction, as described herein, may provide one or more rules for reporting reference signal measurements that correspond to reference signal measurements that previously failed to be transmitted from the UE 215 (e.g., skipped measurements) in a vector-based report (e.g., a vector report). For example, a differential report format design may be applied to the vector report. In some examples, the differential report format design may be applied to the vector report to reduce overhead. Additionally, or alternatively, the differential report format design (e.g., applied to the vector report) may enable the UE 215 to report (e.g., in a single report occasion) multiple reference signal measurements performed at the UE 215 during multiple (e.g., different) time instances (e.g., a time series of RSRP values, a time series of SINR values) as input for beam prediction at the network node 205. In some examples, timestamps that correspond to each of the power values (e.g., RSRPs, SINRs) may be included in report, for example with the power values. Additionally, or alternatively, timestamps that correspond to each of the power values included in the report may be implicitly identified, for example based on the one or more rules or configurations.

As illustrated in the example of FIG. 2, the UE 215 may receive control signaling 220 from the network node 205. In some examples, the control signaling 220 may identify a set of quantized values (e.g., a quantization range, a quantization level, a quantity of bits) to be used at the UE 215 for beam management reporting for multiple beams (e.g., multiple beams at the network node 205). For example, the control signaling 220 may indicate a codebook (e.g., a quantization codebook) that may be one of a multiple codebooks configured at the UE 215 for beam management reporting. In such an example, the set of quantized values may be identified in the codebook. For example, the codebook may define the quantization range, the quantization level, and the of bits to be used for beam management reporting.

In some examples, the UE 215 may receive a set of reference signals that correspond to a set of beams (e.g., the beam 230-*a* corresponding to index #1, the beam 230-*b* corresponding to index #2, and the beam 230-*c* corresponding to index #3) used at the network node 205 to transmit the set of reference signals. That is, each reference signal of the set of reference signals may be associated with a beam of the multiple beams at the network node 205. For example, the set of reference signals may include a reference signal transmitted to the UE 215 using the beam 230-*a* (e.g., corresponding to index #1), a reference signal transmitted to the UE 215 using the beam 230-*b* (e.g., corresponding to index #2), and a reference signal transmitted to the UE 215 using the beam 230-*c* (e.g., corresponding to index #3). The UE 215 may transmit a measurement report 225 indicating a set of power values (e.g., the set of power values 240) that may be based on the set of quantized values and the set of reference signals received at the UE 215 (e.g., using the beams 230). For example, each power value (e.g., of the set of power values 240) may be associated with a respective beam of the set of beams. For example, the set of power values 240 may include a receive power (e.g., an RSRP value or an SINR value) measured at the UE 215 for the reference signal transmitted to the UE 215 using the beam 230-*a*, the reference signal transmitted to the UE 215 using the beam 230-*b*, and the reference signal transmitted to the UE 215 using the beam 230-*c*.

In some examples, the control signaling 220 may indicate a set of rules for vector-based beam management reporting for the multiple beams. In such examples, the measurement report 225 may include a vector report. For example, the UE 215 may transmit a vector report (e.g., the measurement report 225) indicating the set of power values 240 based on the set of rules (e.g., indicated using the control signaling 220) and the set of reference signals received at the UE 215. The network node 205 may use the set of power values 240 (e.g., indicated using the measurement report 225) as input for the beam prediction procedure 255. In some examples, using the power values 240 as input for the beam prediction procedure 255 may improve the accuracy of the output beam prediction 250, among other possible benefits.

Figure 3:
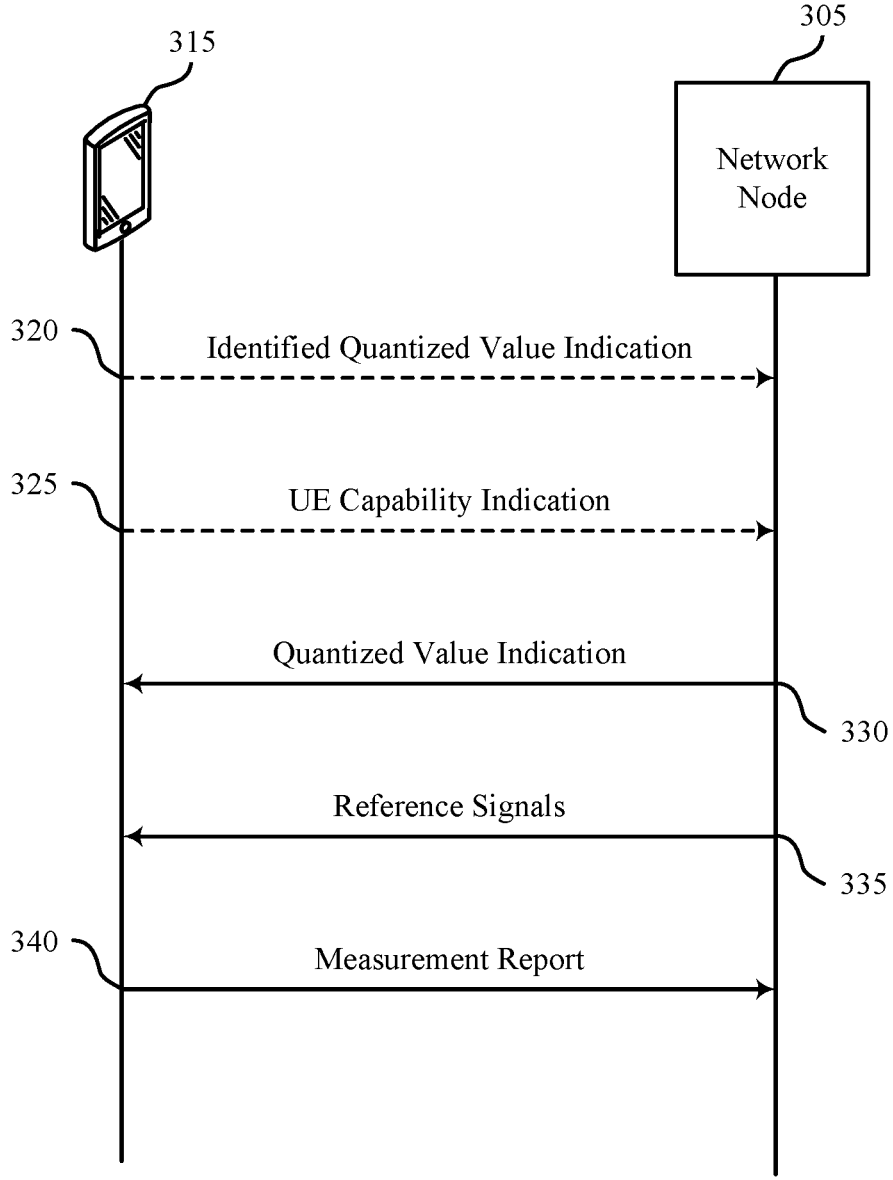
FIGS. 3 and 4 each illustrates an example of a process flow that supports beam report enhancements for beam prediction in accordance with one or more aspects of the present disclosure.

FIG. 3 illustrates an example of a process flow 300 that supports beam report enhancements for beam prediction in accordance with one or more aspects of the present disclosure. The process flow 300 may implement or be implemented at one or more aspects of the wireless communications system 100 and the wireless communications system 200. For example, the process flow 300 may include a network node 305 and a UE 315, which may be examples of the corresponding devices as described with reference to FIGS. 1 and 2. In the example of FIG. 3, the network node 305, may be an example of one or more network entities (e.g., a CU, a DU, an RU, a base station, an IAB node, a TRP, or one or more other network nodes) as described with reference to FIGS. 1 and 2. The process flow 300 may be implemented at the network node 305, the UE 315, or both. In the following description of the process flow 300, operations between the network node 305 and the UE 315 may occur in a different order or at different times than as shown. Some operations may be omitted from the process flow 300 and other operations may be added to the process flow 300. The process flow 300 may include features for improved communications between the UE 315 and the network node 305, among other possible benefits.

As illustrated in the example of FIG. 3, the network node 305 may configure the UE 315 with a set of quantized values for beam measurement reporting. For example, to achieve increased accuracy of beam predictions (e.g., at the network node 305 using a machine learning model), the network node 305 may indicate, to the UE 315, to report power values (e.g., RSRP feedback) according to a reduced quantization level (e.g., relatively refined quantization level). In some examples, the quantization level (e.g., a minimum quantization level or an otherwise suitable quantization level (e.g., at or below a threshold level)) indicated to the UE 315 (e.g., and used in a measurement report) may be based on one or more capabilities of the UE 315, such as a UE capability of measurement error. Additionally, or alternatively, the quantization level may depend on a machine learning model (e.g., a beam prediction algorithm) used at the network node 305.

At 330, the UE 315 may receive a quantized value indication from the network node 305. For example, the UE 315 may receive control signaling (e.g., including the quantized value indication) identifying, for multiple beams, a set of quantized values for beam management reporting for the multiple beams. The set of quantized values may be one of multiple sets of quantized values configured at the UE 315. For example, the network node 305 may configure multiple codebooks (e.g., quantization codebooks) at the UE 315. In such an example, the set of quantized values may be identified using a codebook. For example, the network node 305 may indicate a codebook to be used at the UE 315. The codebook may identify a quantity of bits to be used (e.g., in the measurement report) to represent a power value (e.g., an RSRP value, an SINR value) and a quantization range (e.g., a range of values for RSRP quantization, a range of values for SINR quantization), among other examples. In some examples, a codebook (e.g., one of the multiple codebooks configured at the UE 315) may correspond to a default codebook (e.g., for L1 beam reporting). Additionally, or alternatively, each codebook may correspond to (e.g., define) the quantization range, the quantization level, and the quantity of bits to be used for the measurement report (e.g., a quantity of bits to use to indicate an absolute value of a power measurement, or a quantity of bits to use to indicate a differential value of a differential report, or both).

In some examples, the network node 305 may indicate, to the UE 315, which codebook may be used at the UE 315 for a report occasion. For example, the UE 315 may receive an indication activating a report configuration associated with the set of quantized values. That is, the quantized value indication may be transmitted to the UE 315 dynamically, for example using a MAC-CE or a DCI used to activate a report configuration. In such an example, the set of quantized values may be identified using the activated report configuration. Additionally, or alternatively, the quantized value indication may be transmitted to the UE 315 (e.g., at 330) using RRC signaling, such as using a report configuration IE (e.g., the CSI-ReportConfig IE). For example, the codebook (e.g., including the set of quantized values) may be indicated as part of a report quantity IE. For example, the network node 305 may indicate a codebook using the reportQuantity parameter and setting the reportQuantity parameter to "RSRP(codebook1)" or to "RSRP(codebook2) ."

In some examples, the UE 315 may indicate (e.g., recommend) a codebook (e.g., a quantization codebook) to the network node 305. For example, at 320, the UE 315 may transmit an identified quantized value indication to the network node 305. In some examples, the UE 315 may transmit the identified quantized value indication using control signaling. For example, the UE 315 may transmit control signaling indicating a set of quantized values identified at the UE 315. In such an example, the quantized value indication (e.g., received at the UE 315 at 330) may be based on the identified quantized value indication transmitted from the UE 315 at 325. In some examples, the identified quantized value indication (e.g., transmitted from the UE 315 at 320) may be based on one or more capabilities of the UE 315. For example, the codebook indicated using the identified quantized value indication may be based on a measurement accuracy capability of the UE 315 (e.g., a measurement accuracy supported at the UE 315). Additionally, or alternatively, the codebook (e.g., indicated using the identified quantization value indication) may be based on a power status (e.g., batter level) associated with a battery at the UE. For example, using a relatively coarse quantization level may reduce a frequency at which the UE 315 may transmit a measurement report to the network node 305 (e.g., may lead to relatively less frequent feedback). As such, if a power level of a battery associated with the UE 315 is relatively low, the UE 315 may determine to use (e.g., may determine to indicate to the network node 305) a relatively coarse quantization level.

At 335, the UE 315 may receive a set of reference signals that correspond to a set of beams (e.g., of the multiple beams). In some examples, each reference signal of the set of reference signals may be associated with a beam of the multiple beams. That is, the network node 305 may transmit the set of reference signals using the set of beams.

At 340, the UE 315 may transmit a measurement report indicating a set of power values that are based on the set of quantized values (e.g., indicated to the UE using the quantized value indication) and the set of reference signals received at the UE 315. In some examples, each power value of the set of power values may be associated with a respective beam of the set of beams. That is, each power value may correspond to a measurement performed on a reference signal (e.g., of the set of reference signals) transmitted using a beam (e.g., of the set of beams).

In some examples, the UE 315 may feedback a measure of error for the reported set of power values (e.g., reported RSRP values, reported SINR values) to the network node 305. For example, the UE 315 may transmit control signaling indicating an error value associated with the set of power values. In response, the UE 315 may receive control signaling from the network node 305 identifying another set of quantized values (e.g., from the multiple sets of quantized values configured at the UE 315) based on the indicated error value. In some examples, the control signaling may indicate a codebook from the multiple codebooks configured at the UE 315. The indicated error value (e.g., the measure of error) may include a standard deviation of the error determined at the UE 315 (e.g., for the set of power values), for example due to noise and interference in the power measurements. Additionally, or alternatively, the UE 315 may report a single error value (e.g., a single measure of error) as an average error (or standard deviation) for the set of power values. In some examples, the UE 315 may report an estimated error value (e.g., an estimated measure of error) for each reference signal measurement in the measurement report (e.g., transmitted from the UE 315 at 340). That is, the indicated error value may correspond to a standard deviation of an error associated with the set of power values, an average error associated with the set of power values, an estimated error for each power value of the set of power values, or any combination thereof.

In some examples, the UE 315 may report one or more capabilities of the UE 315 associated with quantization of power values included in the measurement report. For example, at 325, the UE 315 may transmit a UE capability indication to the network node 305. In some examples, the UE capability indication may indicate a capability of the UE 315 for quantization of reference signal measurements (e.g., RSRP quantization, SINR quantization). In some examples, the UE 315 may report a quantization level (e.g., a minimum quantization level or an otherwise suitable quantization level (e.g., at or below a threshold level)) in the measurement report transmitted at 340. In some examples, the quantization level may be based on an measurement accuracy capability of the UE 315. For example, the UE 315 may indicate a quantization level that is equal to or greater than a measurement accuracy supported at the UE 315 (e.g., if the UE 315 is capable of achieving a measurement accuracy of about 1 dB, the UE 315 may indicate a quantization level equal to or greater than 1 dB). Additionally, or alternatively, the UE capability indication may indicate whether the UE 315 may support one or more dynamic indications (e.g., from the network node 305) of one or more quantization rules for reference signal measurement reporting (e.g., RSRP reporting, SINR reporting). For example, the UE 315 may transmit control signaling indicating a quantization level supported at the UE 315, a rule for reference signal reporting supported at the UE 315, or both. In some examples, the set of quantized values indicated to the UE 315 (e.g., using the quantized value indication transmitted at 330) may be based on the UE capability indication.

For example, the UE capability indication may indicate a quantity of codebooks (e.g., quantization codebooks) capable of being supported at the UE 315 (e.g., simultaneously). In some examples, the UE 315 may support a single codebook. In some other examples, the UE 315 may support multiple codebooks. In such examples (e.g., if the UE 315 supports more than one codebook), the network may configure the UE 315 with multiple codebooks (e.g., additional codebooks for beam predictions). For example, the UE 315 may transmit control signaling (e.g., the UE capability indication at 325) indicating a quantity of sets of quantized values capable of being supported at the UE 315. In response, the UE 315 may receive control signaling configuring the UE 315 with multiple sets of quantized values (e.g., multiple codebooks). In some examples, configuring the UE 315 with multiple set of quantization values (e.g., multiple codebooks) may improve beam predictions at the network node 305 and may lead to increased throughput and higher data rates within a wireless communications system, among other possible benefits.

Figure 4:
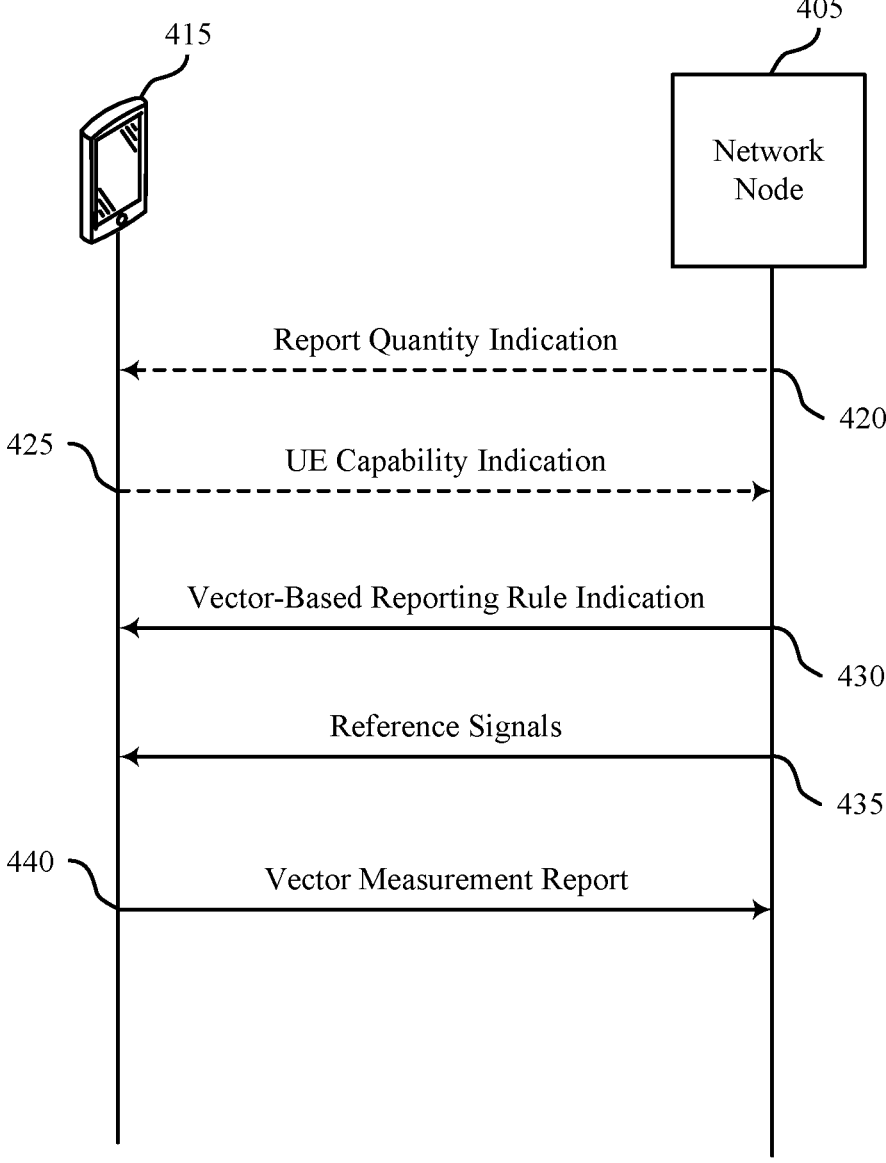

FIG. 4 illustrates an example of a process flow 400 that supports beam report enhancements for beam prediction in accordance with one or more aspects of the present disclosure. The process flow 400 may implement or be implemented at one or more aspects of the wireless communications system 100, the wireless communications system 200, and the process flow 300. For example, the process flow 400 may include a network node 405 and UE 415, which may be examples of the corresponding devices as described with reference to FIGS. 1 through 3. In the example of FIG. 4, the network node 405, may be an example of one or more network entities (e.g., a CU, a DU, an RU, a base station, an IAB node, a TRP, or one or more other network nodes) as described with reference to FIGS. 1 through 3. The process flow 400 may be implemented at the network node 405, the UE 415, or both. In the following description of the process flow 400, operations between the network node 405 and the UE 415 may occur in a different order or at different times than as shown. Some operations may be omitted from the process flow 400 and other operations may be added to the process flow 400. The process flow 400 may include features for improved communications between the UE 415 and the network node 405, among other possible benefits.

As illustrated in the example of FIG. 4, the network node 405 may configure the UE 415 with one or more rules for vector-based beam measurement reporting. For example, at 430, the UE 315 may receive control signaling (e.g., a vector-based reporting rule indication) from the network node 405 indicating a set of rules for vector-based beam management reporting for multiple beams. In some examples, the network node 405 may configure the UE 415 (e.g., using the vector-based reporting rule indication) with a set of reference signal (e.g., a list of CSI-RSs or SSBs) to be measured at the UE 415.

In some examples, the vector-based reporting rule indication may be indicated to the UE 415 using a report configuration IE (e.g., the CSI-ReportConfig IE). For example, a report quantity parameter (e.g., the reportQuantity parameter) may be includes in the report configuration IE to indicate vector-based reporting to the UE 415 (e.g., to differentiate vector-based reporting from other types of beam measurement reporting). For example, the report quantity parameter may be set to "vector L1-RSRP report" for a vector-based report. In such an example, the report quantity parameter may indicate (e.g., identify) the one or more rules for vector-based reporting to UE 415. For example, if the report quantity parameter is set to "L1-RSRP report", the UE 415 may report a quantity of power values (e.g., up to about four power values corresponding to up to about four configured reference signals) and the corresponding reference signal IDs. However, if the report quantity parameter is set to "vector L1-RSRP report", the UE 415 may report another quantity of power values (e.g., all power values corresponding to all configured reference signals) in a vector report that may exclude an indication of the corresponding reference signal IDs.

Additionally, or alternatively, the UE 415 may determine (e.g., implicitly) to perform vector-based reporting based on one or more other configurations. For example, the vector-based reporting rule indication may include a timestamp that may indicate to the UE 415 that the beam measurement report is to be used as input for a beam prediction (e.g., using a machine learning model). In such an example, the report configuration may indicate a timestamp that corresponds to the measurements to be included in the vector-based report (e.g., the reported measurements). For example, the timestamp may indicate, to the UE 415, to include a quantity of power values measured (e.g., relatively recently) using the configured reference signals during a duration of time associated with the timestamp (e.g., multiple time instances prior to, around, or subsequent to a time instance associated with the timestamp). In some examples, the inclusion of a timestamp may indicate, to the UE 415, that the report is to be used for beam predictions (e.g., at the network node 405). As such, the UE 415 may determine to transmit a vector-based report (e.g., autonomously based on the inclusion of the timestamp). In some examples, if a timestamp is excluded from a report configuration, the UE 415 may determine to use a default measurement report (e.g., associated with one or more other rules).

At 435, the UE 415 may receive a set of reference signals (e.g., corresponding to the configured set of reference signal) from the network node 405. The UE 415 may measure and report power values (e.g., RSRPs values, SINR values) for the configured reference signals (e.g., all of the reference signals) in a vector report.

For example, at 440, the UE 415 may transmit a vector measurement report (e.g., a vector report) indicating a set of power values that are based on the set of rules (e.g., configured at the UE 415 using the vector-based reporting rule indication received at 430) and the set of reference signals received at the UE 415. In some examples, each power value of the set of power values may be associated with a beam of the set of beams. In some examples, the vector report may exclude identifiers (e.g., explicit identifiers) for the reported reference signals (e.g., CSI-RS IDs or SSB IDs). For example, indices of the power values may be included in the report that indicate reference signal IDs for each respective power value of the reported vector (e.g., each RSRP value or each SINR value include in the vector report). That is, the mth entry of the vector report may correspond to the power value of the mth reference signal in the configured set of reference signals (e.g., the mth entry in the configured reference signal list).

In some examples, the UE 415 may not be capable of measuring a configured reference signal. For example, a measurement occasion of a configured reference signal (e.g., a CSI-RS or SSB) may conflict with (e.g., overlap in time with) other scheduled downlink signals and, as such, the UE 415 may refrain from measuring the reference signal during the measurement occasion (e.g., may not receive the reference signal). That is, the UE 415 may determine that the UE 415 failed to receive a reference signal associated with a beam (e.g., of the set of beams indicated to the UE 415) and, as such, that the corresponding power value (e.g., measurement occasion) is unavailable to (e.g., may be skipped at) the UE 415. In such examples, the UE 415 may use a default (e.g., reserved) index to indicate a power value for the unavailable reference signal (e.g., skipped measurement occasion). In some examples, the default index may correspond to a relatively lowest power value in the vector report range (e.g., a relatively lowest or otherwise suitable power value (e.g., at or below a threshold value) of a range of power values included in the vector report). That is, an index corresponding to the beam used to transmit the unavailable reference signal may include the default index and the power value associated with the default index may correspond to a relatively lowest (or otherwise suitable) power value (e.g., at or below a threshold value) of the set of power values.

Additionally, or alternatively, if a power value of a reference signal is unavailable to the UE 415 (e.g., not measured at the UE 415), the UE 415 may interpolate the power value for the unavailable reference signal. In some examples, the network node 405 may configure the UE 415 with a formula (e.g., function) that may indicate how to interpolate the power values (e.g., how to obtain the unavailable power value based on the power values measured at the UE 415 relatively recently). For example, the UE 415 may receive control signaling indicating the function (e.g., the interpolation function) to be used at the UE 415 for interpolating power values. In some examples, the function may be based on historical power values reported from the UE 415 (e.g., the power values measured at the UE 415 relatively recently). In such examples, the power value of the unavailable reference signal may be based on the indicated function.

In some examples, the network node 405 may configure the UE 415 to apply a differential report format design to the vector report (e.g., to further reduce overhead). In such examples, a highest power value (or an otherwise suitable power value (e.g., at or above a threshold value)) may be reported as measured at the UE 415 (e.g., as an absolute value), while the other power values (e.g., corresponding to other received powers associated with other beams included in the vector report) may be reported as a difference relative to the highest (or otherwise suitable) power value (e.g., at or above a threshold value). In some examples, the highest (or otherwise suitable) power value may correspond to a strongest (or otherwise suitable) received power of a beam of the set of beams (e.g., any one of the beams included in the vector report) (e.g., which may at or above a threshold value).

In some examples, the format of the vector-based differential report may indicate for the UE 415 to report a beam ID (or reference signal ID) of the strongest (or otherwise suitable) beam (or strongest or otherwise suitable reference signal (e.g., at or above a threshold value)) and the corresponding power value (e.g., using an absolute value). In such an example, the beam ID (or reference signal ID) included in the report (e.g., the ID associated with the strongest or otherwise suitable beam or the strongest or otherwise suitable reference signal) may be a same ID among the power values included in the vector report (e.g., the report may exclude raw beam IDs or raw reference signal IDs). That is, the report may exclude beam IDs (or reference signal IDs) for power values that may not correspond to the highest (or otherwise suitable) power value (e.g., at or above a threshold value). For example, a network node 405 may transmit a quantity of reference signals (e.g., about 64 SSBs) and the UE 415 may include a portion of the transited SSBs (e.g., SSBs corresponding to the indices 1, 3, 5, and 64) in the report. In such an example, the UE 415 may report a single beam ID (or reference signal ID) for each reference signal of the included portion (e.g., each of the SSBs corresponding to the indices 1, 3, 5, and 64). In some examples, the included beam ID (or reference signal ID) may correspond to the ID of the beam (or reference signal) associated with the highest (or otherwise suitable) power value (e.g., the strongest or otherwise suitable SSB received power (e.g., at or above a threshold value)). Additionally, or alternatively, the UE 415 may indicate the beam ID (or reference signal ID) a quantity of bits (e.g., about 2 bits) that may be relatively less than a quantity of bits (e.g., about 6 bits) that may be used to indicate multiple beam IDs (or reference signal IDs) for the include portion of reference signals.

In some examples, an order of the remaining power values included in the vector report (e.g., the beams that may not correspond to the strongest or otherwise suitable beam) may be determined based on the one or more rules (e.g., indicated to the UE 415 using the vector-based reporting rule indication). In some examples, the one or more rules may indicate for the UE 415 to order the power values based on an order of the reference signal indices (or beam indices). For example, a first power value of the set of power values (e.g., a power value sequentially first in the vector report, a power value corresponding to the highest or otherwise suitable power value) may be indicated using a first quantity of bits and a second power value of the set of power values (e.g., a power value sequentially second in the vector report) may be indicated using a second quantity of bits based on the ordering. In such an example, the first power value may exceed (e.g., be greater than) the second power value (e.g., the first power value may correspond to the highest or otherwise suitable power value) and the first quantity of bits may exceed (e.g., be greater than) the second quantity of bits. For example, the second power value may correspond to a power value difference relative to the first power value.

As an illustrative example, the network node 405 may indicate, to the UE 415, to measure a certain quantity of SSBs (e.g., 8 of 64 SSBs transmitted from the network node 405). For some beam measurement reporting formats, the network node 405 may configure the UE 415 with two PUCCH report occasions, and each PUCCH report occasion (e.g., each configuration) may corresponds to a subset of the quantity of beams (e.g., about 4 of the SSBs, about 4 beams). Additionally, or alternatively, for each beam, the UE 415 may be configured to use a certain quantity of bits (e.g., about 6 bits) to indicate the SSB IDs. As such, for each PUCCH report occasion, the UE 415 may use a certain quantity of bits (e.g., about 7 bits) to report a power value corresponding to the strongest (or otherwise suitable) beam and another quantity of bits (e.g., about 4 bits) to report other power values corresponding to other beams. As such, a report transmitted from the UE 415 for each report occasion may include a quantity of bits (e.g., about 84 bits).

In other examples, the UE 415 may use a vector-based reporting format in which the UE 415 may use about 7 bits to indicate a power value for each beam. In such examples, a vector report transmitted from the UE 415 (e.g., for each report occasion) may include about 56 bits. Additionally, or alternatively, the UE 415 may use a differential vector-based reporting format in which the UE 415 may use a certain quantity of bits (e.g., about 7 bits) to indicate a power value corresponding to the strongest (or otherwise suitable) beam, a certain quantity of bits (e.g., about 3 bits) to indicate a corresponding beam ID (or reference signal ID), and a certain quantity of bits (e.g., about 4) bits to indicate power values for each of the other beams. In such an example, a differential vector report transmitted from the UE 415 (e.g., for each report occasion) may include a certain quantity of bits (e.g., about 38 bits), which may be less than the report transmitted from the UE 415 for each report occasion discussed above (which was, in an example, about 84 bits). Therefore, transmitting the differential vector report may lead to reduce overhead, while enabling reporting of an increased quantity of power values (e.g., power values for an increased quantity of beams, power values for about 8 or more beams).

In some examples, the network node 405 may configure a list of transmission configuration indicator (TCI) states at the UE 415, in which each TCI state may be defined based on a reference signal ID (e.g., a source reference signal ID) and may represent a beam associated with the reference signal corresponding to the reference signal ID. The TCI state may be applied to indicate a beam for a scheduled downlink or uplink transmission (e.g., scheduled for the UE 415). For example, if a TCI state is applied to at least an uplink channel or an uplink signal (e.g., a physical uplink shared channel (PUSCH) signal, a physical uplink control channel signal (PUCCH), an SRS), the network node 405 may configure power control parameters and one or more path loss reference signals (PL-RSs) associated with the TCI state and the corresponding uplink channel or the corresponding uplink signal. In some examples, to calculate a Type 1 power headroom based on an uplink signal (e.g., a PUSCH signal, a reference PUSCH signal), the UE 415 may use one or more uplink power control parameters (i.e., PL-RS, a transmit power (P0), a fraction of pathloss that the UE 415 may be capable of compensating for ($\alpha$), a closed loop index (h)) associated with the TCI state for the UE 415 (e.g., for the PUSCH transmission). The PL-RS may be a reference signal (e.g., an SSB) transmitted from a cell different from a cell serving (e.g., currently serving) the UE 415. In such examples, a PL-RS configuration for the uplink signal (e.g., the PUSCH transmission) may be (e.g., optionally) configured for the UE 415 with a physical cell ID (PCI) configuration using RRC signaling (e.g., which may indicate the PCI associated with the PL-RS SSB).

The UE 415 may be configured to measure one or multiple sets of reference signals and detect whether a beam failure may occur (e.g., for a particular cell or TRP). In some examples, if a beam failure event is detected, the UE 415 may perform a beam failure recovery procedure. For example, the UE 415 may transmit a beam failure recovery MAC-CE that may indicate a cell ID or a TRP ID (or both) associated with the beam failure and another beam ID (e.g., one or more replacement beam IDs) to be used by the UE 415 (e.g., after performing the beam failure recovery procedure). The UE 415 may be configured to monitor for beam failures in multiple serving cells. For example, if a beam failure is detected in multiple serving cells, beam failure recovery information of a first serving cell (e.g., with cell-specific beam failure recovery) and a second serving cell (e.g., with TRP-specific beam failure recovery) may be reported in a same MAC-CE (e.g., a same beam failure recovery MAC-CE). In some examples, if at least one serving cell (e.g., the first serving cell, or the second service cell, or both) is associated with a cell-specific reference signal set (e.g., indicated as q0) and multiple TRP-specific reference signal sets (e.g., indicated as q0,1 and q1,1), the UE 415 may provide (e.g., in a beam failure recovery MAC-CE) one or more indices for the one or more cells. For example, the UE 415 may provide (e.g., in the beam failure recovery MAC-CE) one or more indices for one or more cells with the cell-specific reference signal set (e.g., q0) that may have a reduce radio link quality (e.g., a radio link quality less than a predefined threshold, such as may be indicated using a Qout,LR IE), one or more indications of one or more replacement beams (e.g., a presence of one or more replacement beams), or one or more indications of reference signal IDs from corresponding TRP-specific reference signal sets (e.g., q1,0, or q1,1, or both) for each of the at least one serving cell.

In some examples of differential vector-based reporting, the UE 415 may report multiple power values (e.g., multiple RSRP values, multiple SINR values) for a beam, which may be indicated using a single reference signal ID or a single TCI state ID in one report occasion. The UE 415 may report multiple power values that may correspond to a same beam (e.g., corresponding to a same reference signal ID, a same TCI state ID, or a same beam ID) and multiple (e.g., different) time instances. For example, the differential vector-based report may include multiple power values measured at multiple time instances for a single beam or for multiple beams that may be indicated using a same reference signal ID (or beam ID).

In some examples, the time instances in which the reported power values were measured may be reported to the network node 405 (e.g., using timestamps) or may be identified according to the one or more rules (e.g., indicated to the UE 415 using the vector-based reporting rule indication). For example, at 420, the UE 415 may receive a report quantity indication that may indicate for the UE 415 to report a quantity (N) of power values corresponding to measurements (e.g., previous measurements) performed at the UE 415 (e.g., prior to the report occasion that may be indicated via a timestamp included in the vector-based reporting rule indication). In such an example, the UE 415 may transmit (e.g., in the vector measurement report transmitted from the UE 415 at 440) an indication of the set of power values and a timestamp associated with the set of power values. In such an example, the time instances may be identified based on the timestamp and the report quantity indication. For example, each power value of the set of power values may correspond to a respective time instance prior to a time instance of the timestamp.

Additionally, or alternatively, the UE 415 may use a vector report to report power values measured across different time instances to reduce overhead. For example, network node 405 may configure the UE 415 with a differential vector-based measurement report format, in which the UE 415 may report power values using two-dimensional (2D) indices that may include an index corresponding to the time instance of the measurement and an ID of the respective beam (e.g., (time, beam ID)). In such an example, the ordering of the power values in the vector report (e.g., the vector measurement reporting transmitted from the UE at 440) may be based on the beams (e.g., power values may be indicated in the report sequentially based on the associated beam ID) or the time instances (e.g., power values may be indicated in the report sequentially based on the associated time instance). That is, the differential vector-based measurement report format may be applied to report power values in the time domain (e.g., in an order based on the time instance in which the measurements were performed), the beam domain (e.g., in an order based on the ID of the corresponding beam), or across both the time domain and the beam domain (e.g., based jointly on the time instance in which the measurement was performed and the corresponding beam ID).

As an illustrative example, the network may configure the UE 415 to report reference signal measurements for a quantity (N) of reference signals (e.g., a quantity of reference signals indexed from 1 to N) at a quantity (M) of time instances (e.g., a quantity of time instances ranging from 0 to M). In such an example, the UE 415 may be configured to report the highest (or otherwise suitable) power value (e.g., corresponding to the strongest or otherwise suitable beam) as a first value of the values included in the report (e.g., a first power value). In such an example, the first power value may be indicated as an absolute value. Additionally, or alternatively, remaining power values (e.g., indicated as a difference relative to the first power value, a differential power value) may be indicated in an ordered based on the time instance in which the measurements occurred (e.g., power values measured at time instance 0 may be reported prior to power values measured at subsequent time instance, such as time instance 1). In such an example, power values corresponding to a same time instance may be indicated in an order based on the beam identifier. For example, a power value associated with a relatively smallest beam ID may be reported prior to a largest (or otherwise suitable) beam ID. That is, for a same time instance (e.g., and following the first power value), the remaining power values may be ordered within the report sequentially from time instance 0 to time instance m and power values associated with a same time instance may be ordered from first smallest reference signal ID (e.g., the reference signal ID that has a relatively smallest value) to a largest beam ID (e.g., the reference signal ID that has a relatively largest value). For example, a differential vector report may be formatted in accordance with the data structure of Table 3:

TABLE 3

| First Power Value Reference Signal Index | First Power Value Time Index | First Power Value |
|---|---|---|
| z | z | z |
| Differential power value for a remaining power value associated with a first smallest reference signal ID measured at time instance 0 | | |
| Differential power value for a remaining power value associated with a second smallest reference signal ID measured at time instance 0 | | |
| . | | |
| . | | |
| . | | |
| Differential power value for a remaining power value associated with a largest reference signal ID measured at time instance 0 | | |
| Differential power value for a remaining power value associated with a first smallest reference signal ID measured at time instance 1 | | |
| Differential power value for a remaining power value associated with a second smallest reference signal ID measured at time instance 1 | | |
| . | | |
| . | | |
| . | | |
| Differential power value for a remaining power value associated with a largest reference signal ID measured at time instance m | | |

In some examples, the UE 415 may report one or more capabilities of the UE 415 for vector-based measurement reporting. For example, at 425, the UE 415 may transmit a UE capability indication to the network node 405. In some examples, the UE capability indication may indicate a length (e.g., a maximum length or an otherwise suitable length) of a vector report supported at the UE 415. In some examples, the UE 415 may indicate the length of the vector report as a quantity of reference signals. In some examples, configuring the UE 415 with a format (e.g., one or more rules) for vector-based measurement reporting (e.g., and differential vector-based measurement reporting) may improve beam predictions at the network node 405 and may lead to increased throughput and higher data rates within the wireless communications system, among other possible benefits.

Figure 5:
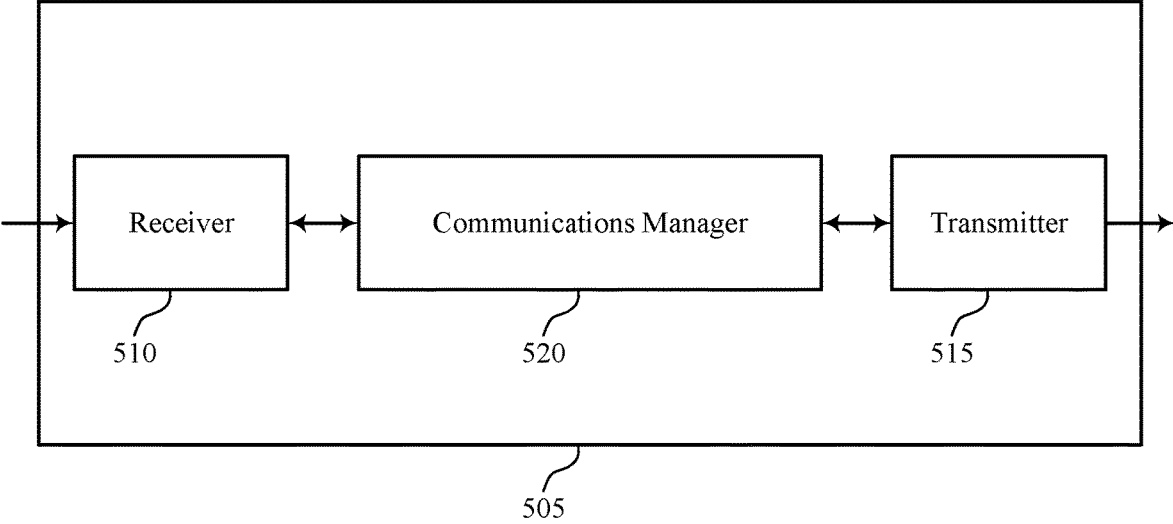
FIGS. 5 and 6 show block diagrams of devices that support beam report enhancements for beam prediction in accordance with one or more aspects of the present disclosure.

FIG. 5 shows a block diagram 500 of a device 505 that supports beam report enhancements for beam prediction in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses). The device 505 may also include one or more processors, memory coupled with the one or more processors, and instructions stored in the memory that are executable by the one or more processors to enable the one or more processors to perform the beam reporting features discussed herein. Each of these components may be in communication with each other (e.g., via one or more buses).

The receiver 510 may provide a means for receiving information such as packets, user data, control information, or any combination thereof associated with various information channels (e.g., control channels, data channels, information channels related to beam report enhancements for beam prediction). Information may be passed on to other components of the device 505. The receiver 510 may utilize a single antenna or a set of multiple antennas.

The transmitter 515 may provide a means for transmitting signals generated by other components of the device 505.

For example, the transmitter 515 may transmit information such as packets, user data, control information, or any combination thereof associated with various information channels (e.g., control channels, data channels, information channels related to beam report enhancements for beam prediction). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of beam report enhancements for beam prediction as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE (e.g., the device 505) in accordance with examples as disclosed herein. For example, the communications manager 520 may be configured as or otherwise support a means for receiving control signaling identifying, for a set of multiple beams, a set of quantized values from a set of multiple sets of quantized values configured at the UE for beam management reporting for the set of multiple beams. The communications manager 520 may be configured as or otherwise support a means for receiving a set of reference signals that correspond to a set of beams of the set of multiple beams, each reference signal of the set of reference signals associated with a beam of the set of multiple beams. The communications manager 520 may be configured as or otherwise support a means for transmitting a report indicating a set of power values that are based on the set of quantized values and the set of reference signals received by the UE, each power value of the set of power values associated with a respective beam of the set of beams.

Additionally, or alternatively, the communications manager 520 may support wireless communication at a UE (e.g., the device 505) in accordance with examples as disclosed herein. For example, the communications manager 520 may be configured as or otherwise support a means for receiving control signaling indicating a set of rules for vector-based beam management reporting for a set of multiple beams. The communications manager 520 may be configured as or otherwise support a means for receiving a set of reference signals that correspond to a set of beams of the set of multiple beams, each reference signal of the set of reference signals associated with a beam of the set of multiple beams. The communications manager 520 may be configured as or otherwise support a means for transmitting a vector report indicating a set of power values that are based on the set of rules and the set of reference signals received by the UE, each power value of the set of power values associated with a beam of the set of beams.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources.

Figure 6:
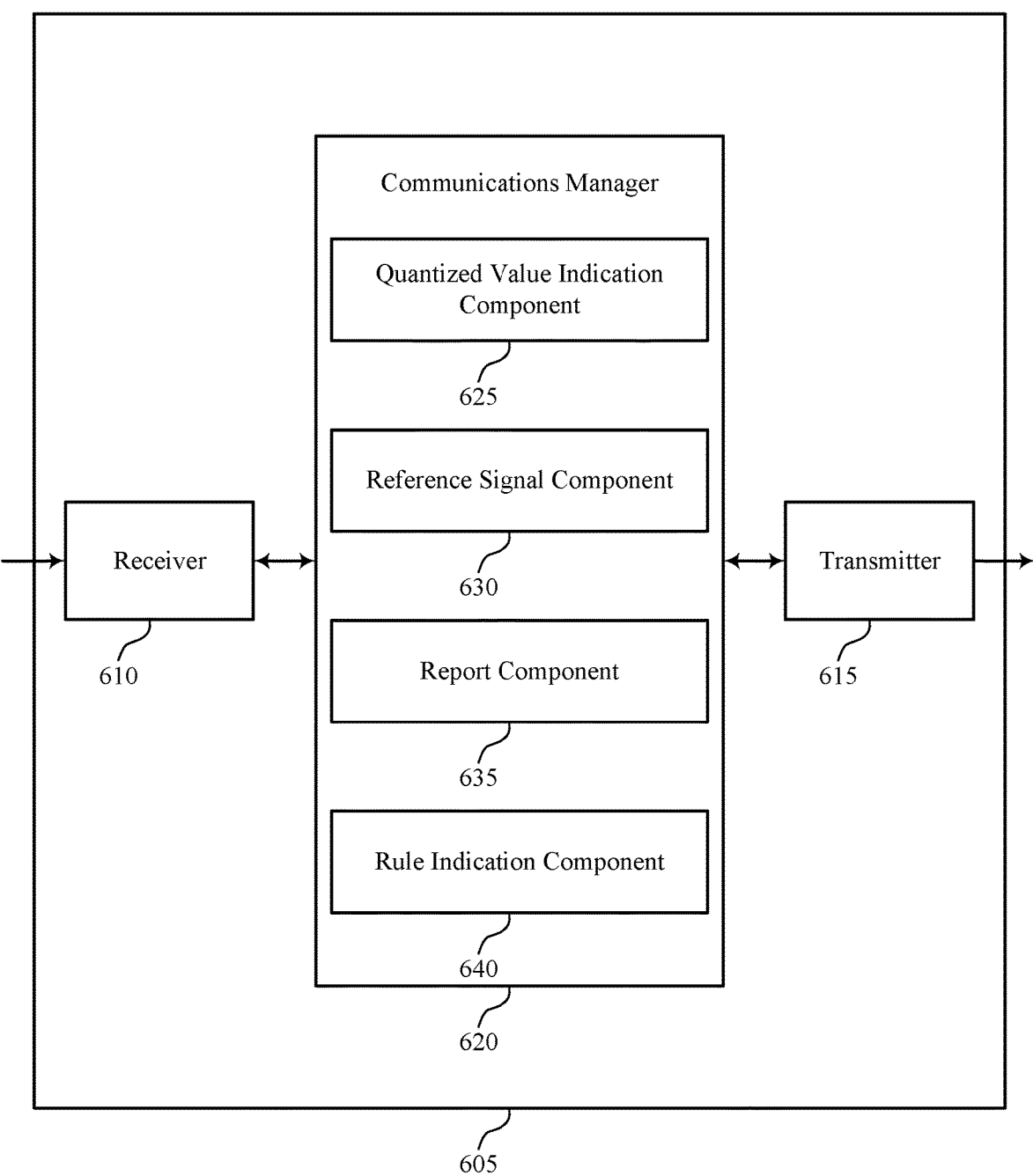

FIG. 6 shows a block diagram 600 of a device 605 that supports beam report enhancements for beam prediction in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam report enhancements for beam prediction). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam report enhancements for beam prediction). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of beam report enhancements for beam prediction as described herein. For example, the communications manager 620 may include a quantized value indication component 625, a reference signal component 630, a report component 635, a rule indication component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE (e.g., the device 605) in accordance with examples as disclosed herein. The quantized value indication component 625 may be configured as or otherwise support a means for receiving control signaling identifying, for a set of multiple beams, a set of quantized values from a set of multiple sets of quantized values configured at the UE for beam management reporting for the set of multiple beams. The reference signal component 630 may be configured as or otherwise support a means for receiving a set of reference signals that correspond to a set of beams of the set of multiple beams, each reference signal of the set of reference signals associated with a beam of the set of multiple beams. The report component 635 may be configured as or otherwise support a means for transmitting a report indicating a set of power values that are based on the set of quantized values and the set of reference signals received by the UE, each power value of the set of power values associated with a respective beam of the set of beams.

Additionally, or alternatively, the communications manager 620 may support wireless communication at a UE (e.g., the device 605) in accordance with examples as disclosed herein. The rule indication component 640 may be configured as or otherwise support a means for receiving control signaling indicating a set of rules for vector-based beam management reporting for a set of multiple beams. The reference signal component 630 may be configured as or otherwise support a means for receiving a set of reference signals that correspond to a set of beams of the set of multiple beams, each reference signal of the set of reference signals associated with a beam of the set of multiple beams. The report component 635 may be configured as or otherwise support a means for transmitting a vector report indicating a set of power values that are based on the set of rules and the set of reference signals received by the UE, each power value of the set of power values associated with a beam of the set of beams.

In some cases, the quantized value indication component 625, the reference signal component 630, the report component 635, and the rule indication component 640 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the quantized value indication component 625, the reference signal component 630, the report component 635, and the rule indication component 640 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
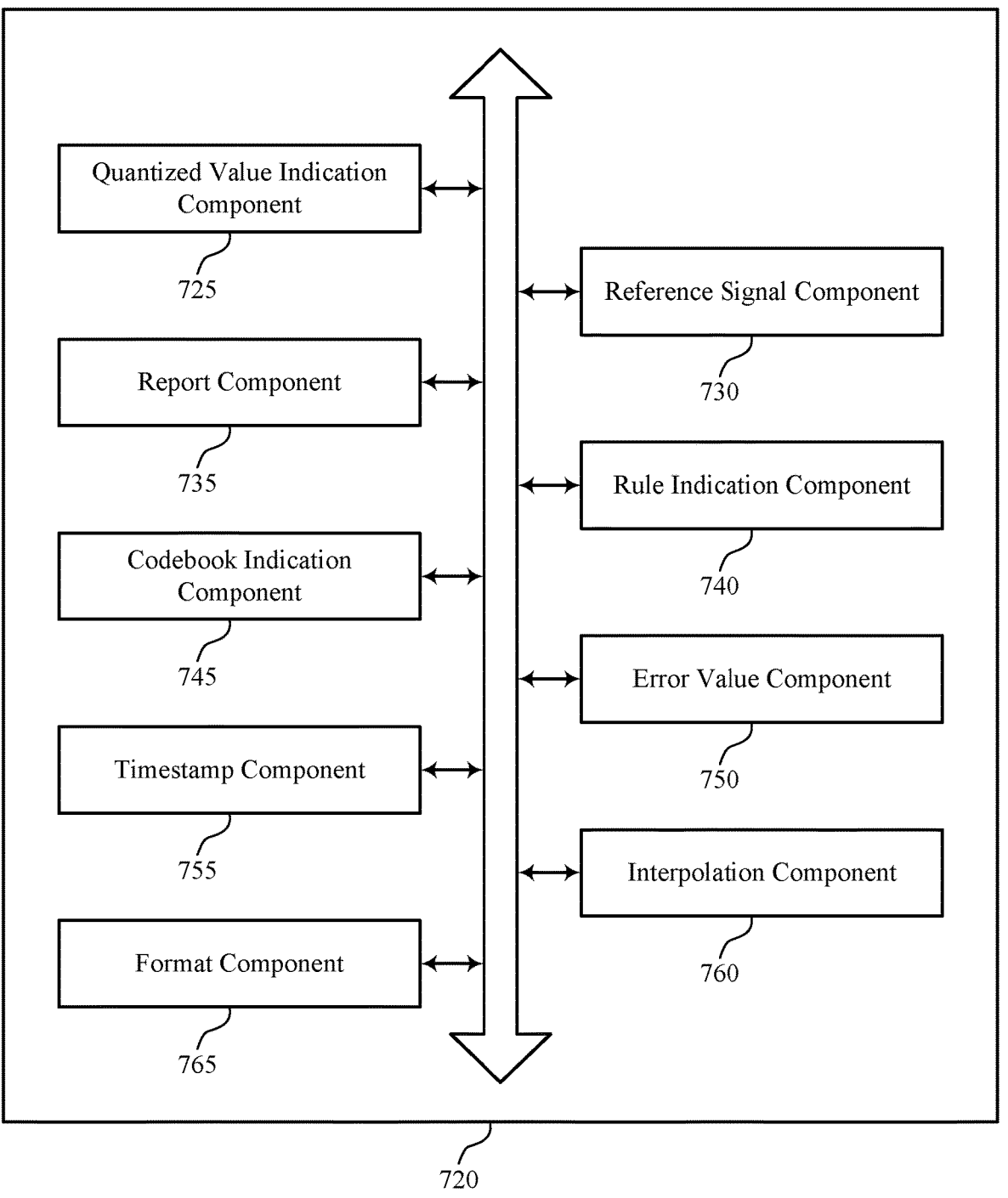
FIG. 7 shows a block diagram of a communications manager that supports beam report enhancements for beam prediction in accordance with one or more aspects of the present disclosure.

FIG. 7 shows a block diagram 700 of a communications manager 720 that supports beam report enhancements for beam prediction in accordance with one or more aspects of the present disclosure. The communications manager 720 may be an example of aspects of a communications manager 520, a communications manager 620, or both, as described herein. The communications manager 720, or various components thereof, may be an example of means for performing various aspects of beam report enhancements for beam prediction as described herein. For example, the communications manager 720 may include a quantized value indication component 725, a reference signal component 730, a report component 735, a rule indication component 740, a codebook indication component 745, an error value component 750, a timestamp component 755, an interpolation component 760, a format component 765, or any combination thereof. Each of these components may communicate, directly or indirectly, with one another (e.g., via one or more buses).

The communications manager 720 may support wireless communication at a UE in accordance with examples as disclosed herein. The quantized value indication component 725 may be configured as or otherwise support a means for receiving control signaling identifying, for a set of multiple beams, a set of quantized values from a set of multiple sets of quantized values configured at the UE for beam management reporting for the set of multiple beams. The reference signal component 730 may be configured as or otherwise support a means for receiving a set of reference signals that correspond to a set of beams of the set of multiple beams, each reference signal of the set of reference signals associated with a beam of the set of multiple beams. The report component 735 may be configured as or otherwise support a means for transmitting a report indicating a set of power values that are based on the set of quantized values and the set of reference signals received by the UE, each power value of the set of power values associated with a respective beam of the set of beams.

In some examples, to support receiving the control signaling identifying the set of quantized values, the codebook indication component 745 may be configured as or otherwise support a means for receiving an indication of a codebook that is one of a set of multiple codebooks configured at the UE for beam management reporting for the set of multiple beams, where the set of quantized values is identified by the codebook.

In some examples, to support receiving the control signaling identifying the set of quantized values, the quantized value indication component 725 may be configured as or otherwise support a means for receiving an indication activating a report configuration associated with the set of quantized values, where the set of quantized values is identified by the report configuration.

In some examples, the quantized value indication component 725 may be configured as or otherwise support a means for transmitting second control signaling indicating a set of quantized values identified by the UE, where receiving the control signaling is based on the second control signaling. In some examples, the set of quantized values is identified by the UE based on a measurement accuracy supported by the UE and associated with the set of power values, a power status associated with a battery at the UE, or both.

In some examples, the error value component 750 may be configured as or otherwise support a means for transmitting second control signaling indicating an error value associated with the set of power values. In some examples, the quantized value indication component 725 may be configured as or otherwise support a means for receiving third control signaling identifying a second set of quantized values from the set of multiple sets of quantized values configured at the UE based on the indicated error value. In some examples, the error value corresponds to a standard deviation of an error associated with the set of power values, an average error associated with the set of power values, an estimated error for each power value of the set of power values, or any combination thereof.

In some examples, the quantized value indication component 725 may be configured as or otherwise support a means for transmitting second control signaling indicating a quantity of sets of quantized values capable of being supported at the UE. In some examples, the quantized value indication component 725 may be configured as or otherwise support a means for receiving third control signaling configuring the UE with the set of multiple sets of quantized values at least in part in response to the quantity of sets of quantized values capable of being supported at the UE.

In some examples, the quantized value indication component 725 may be configured as or otherwise support a means for transmitting second control signaling indicating a quantization level supported at the UE, a rule for reference signal reporting supported by the UE, or both. In some examples, the set of quantized values is based on a machine learning model at a network node. In some examples, the set of quantized values includes a quantization range, a quantization level, a quantity of bits, or any combination thereof.

Additionally, or alternatively, the communications manager 720 may support wireless communication at a UE in accordance with examples as disclosed herein. The rule indication component 740 may be configured as or otherwise support a means for receiving control signaling indicating a set of rules for vector-based beam management reporting for a set of multiple beams. In some examples, the reference signal component 730 may be configured as or otherwise support a means for receiving a set of reference signals that correspond to a set of beams of the set of multiple beams, each reference signal of the set of reference signals associated with a beam of the set of multiple beams. In some examples, the report component 735 may be configured as or otherwise support a means for transmitting a vector report indicating a set of power values that are based on the set of rules and the set of reference signals received by the UE, each power value of the set of power values associated with a beam of the set of beams.

In some examples, to support transmitting the vector report, the report component 735 may be configured as or otherwise support a means for transmitting an indication of the set of power values and a set of indices associated with the set of power values, each index of the set of indices associated with a respective power value and corresponding to a respective beam of the set of beams.

In some examples, the vector report is transmitted based on determining that the UE failed to receive a reference signal associated with a beam of the set of multiple beams. In some examples, an index corresponding to the beam includes a default index and a power value associated with the index includes a lowest power value of the set of power values.

In some examples, the reference signal component 730 may be configured as or otherwise support a means for determining that the UE failed to receive a reference signal associated with a beam of the set of multiple beams. In some examples, the interpolation component 760 may be configured as or otherwise support a means for interpolating a power value corresponding to the beam based on the determination, where transmitting the vector report is based on the interpolation.

In some examples, the interpolation component 760 may be configured as or otherwise support a means for receiving second control signaling indicating a function to be used by the UE for interpolating power values, where the function is based on historical power values reported by the UE, and where interpolating the power value is based on the function.

In some examples, to support receiving the control signaling indicating the set of rules for vector-based beam management reporting, the rule indication component 740 may be configured as or otherwise support a means for receiving an indication of a vector report quantity, where the vector report is transmitted based on the indicated vector report quantity.

In some examples, to support transmitting the vector report, the timestamp component 755 may be configured as or otherwise support a means for transmitting an indication of the set of power values and a timestamp associated with the set of power values, each power value of the set of power values corresponding to a respective time instance prior to a time instance of the timestamp. In some examples, the control signaling further indicates a quantity of measurements associated with the timestamp. In some examples, the set of power values is based on the indicated quantity.

In some examples, the format component 765 may be configured as or otherwise support a means for receiving an indication of a format for vector-based beam management reporting, where the vector report further indicates the respective time instance of each power value of the set of power values based on the format.

In some examples, to support receiving the control signaling indicating the set of rules for vector-based beam management reporting, the rule indication component 740 may be configured as or otherwise support a means for receiving an indication of an ordering for the set of power values, where the vector report indicating the set of power values is transmitted in accordance with the ordering.

In some examples, a first power value of the set of power values is indicated using a first quantity of bits and a second power value of the set of power values is indicated using a second quantity of bits based on the ordering, the first power value being greater than the second power value and the first quantity of bits being greater than the second quantity of bits.

In some examples, the second power value corresponds to a power value difference relative to the first power value. In some examples, the vector report includes an identifier associated with the set of power values, the identifier corresponding to the set of beams.

In some cases, the quantized value indication component 725, the reference signal component 730, the report component 735, the rule indication component 740, the codebook indication component 745, the error value component 750, the timestamp component 755, the interpolation component 760, and the format component 765 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the quantized value indication component 725, the reference signal component 730, the report component 735, the rule indication component 740, the codebook indication component 745, the error value component 750, the timestamp component 755, the interpolation component 760, and the format component 765 discussed herein.

Figure 8:
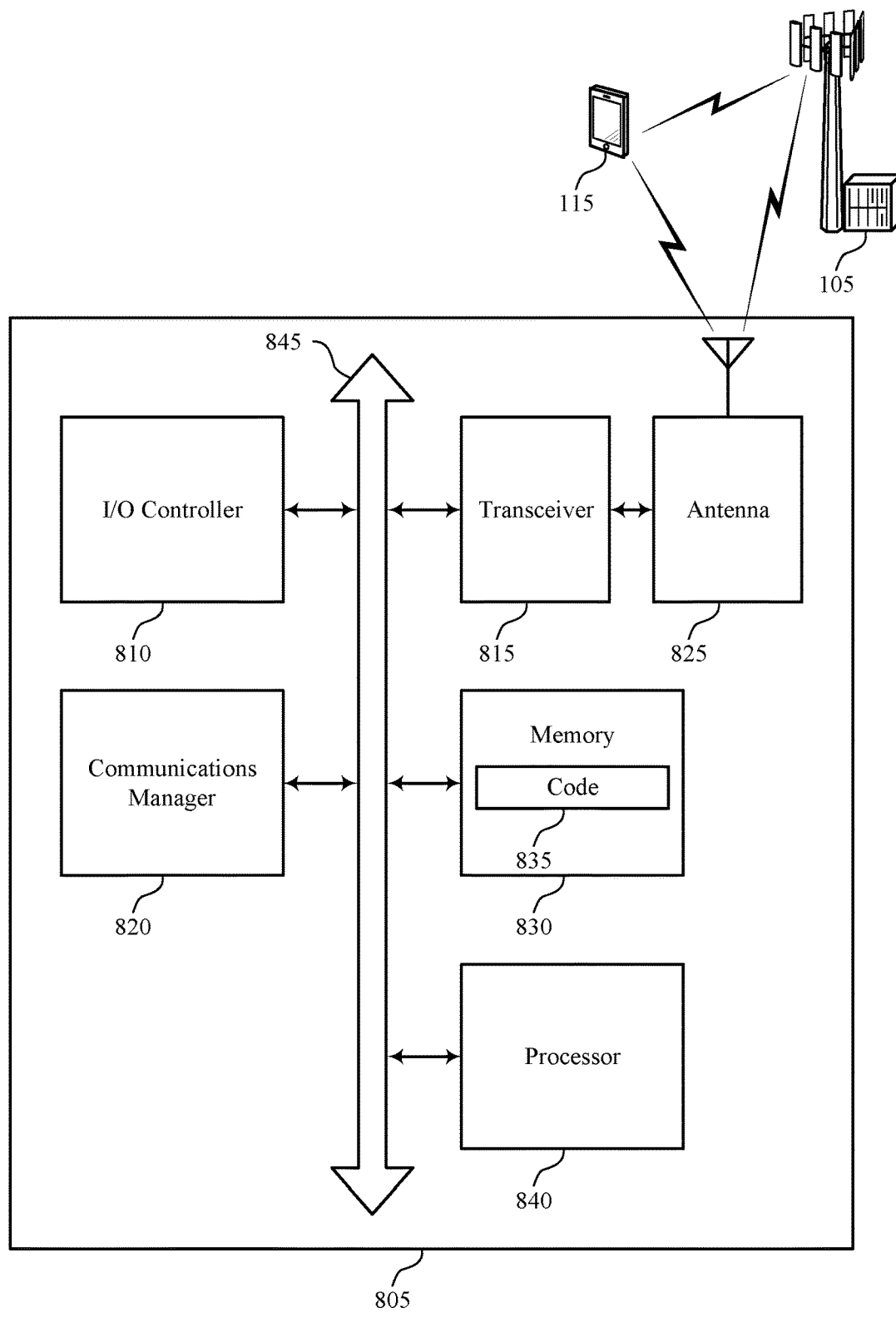
FIG. 8 shows a diagram of a system including a device that supports beam report enhancements for beam prediction in accordance with one or more aspects of the present disclosure.

FIG. 8 shows a diagram of a system 800 including a device 805 that supports beam report enhancements for beam prediction in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bidirectional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bidirectionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting beam report enhancements for beam prediction). For example, the device 805 or a component of the device 805 may include a processor 840 and memory 830 coupled with or to the processor 840, the processor 840 and memory 830 configured to perform various functions described herein.

The communications manager 820 may support wireless communication at a UE (e.g., the device 805) in accordance with examples as disclosed herein. For example, the communications manager 820 may be configured as or otherwise support a means for receiving control signaling identifying, for a set of multiple beams, a set of quantized values from a set of multiple sets of quantized values configured at the UE for beam management reporting for the set of multiple beams. The communications manager 820 may be configured as or otherwise support a means for receiving a set of reference signals that correspond to a set of beams of the set of multiple beams, each reference signal of the set of reference signals associated with a beam of the set of multiple beams. The communications manager 820 may be configured as or otherwise support a means for transmitting a report indicating a set of power values that are based on the set of quantized values and the set of reference signals received by the UE, each power value of the set of power values associated with a respective beam of the set of beams.

Additionally, or alternatively, the communications manager 820 may support wireless communication at a UE in accordance with examples as disclosed herein. For example, the communications manager 820 may be configured as or otherwise support a means for receiving control signaling indicating a set of rules for vector-based beam management reporting for a set of multiple beams. The communications manager 820 may be configured as or otherwise support a means for receiving a set of reference signals that correspond to a set of beams of the set of multiple beams, each reference signal of the set of reference signals associated with a beam of the set of multiple beams. The communications manager 820 may be configured as or otherwise support a means for transmitting a vector report indicating a set of power values that are based on the set of rules and the set of reference signals received by the UE, each power value of the set of power values associated with a beam of the set of beams.

By including or configuring the communications manager 820 in accordance with examples as described herein, the device 805 may support techniques for improved communication reliability, reduced latency, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of beam report enhancements for beam prediction as described herein, or the processor 840 and the memory 830 may be otherwise configured to perform or support such operations.

FIG. 9 shows a flowchart illustrating a method 900 that supports beam report enhancements for beam prediction in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving control signaling identifying, for a set of multiple beams, a set of quantized values from a set of multiple sets of quantized values configured at the UE for beam management reporting for the set of multiple beams. The operations of 905 may be performed in accordance with examples as disclosed herein. In some examples, aspects of the operations of 905 may be performed by a quantized value indication component 725 as described with reference to FIG. 7.

At 910, the method may include receiving a set of reference signals that correspond to a set of beams of the set of multiple beams, each reference signal of the set of reference signals associated with a beam of the set of multiple beams. The operations of 910 may be performed in accordance with examples as disclosed herein. In some examples, aspects of the operations of 910 may be performed by a reference signal component 730 as described with reference to FIG. 7.

At 915, the method may include transmitting a report indicating a set of power values that are based on the set of quantized values and the set of reference signals received by the UE, each power value of the set of power values associated with a respective beam of the set of beams. The operations of 915 may be performed in accordance with examples as disclosed herein. In some examples, aspects of the operations of 915 may be performed by a report component 735 as described with reference to FIG. 7.

FIG. 10 shows a flowchart illustrating a method 1000 that supports beam report enhancements for beam prediction in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving an indication of a codebook that is one of a set of multiple codebooks configured at the UE for beam management reporting for a set of multiple beams, where a set of quantized values is identified by the codebook. The operations of 1005 may be performed in accordance with examples as disclosed herein. In some examples, aspects of the operations of 1005 may be performed by a codebook indication component 745 as described with reference to FIG. 7.

At 1010, the method may include receiving a set of reference signals that correspond to a set of beams of the set of multiple beams, each reference signal of the set of reference signals associated with a beam of the set of multiple beams. The operations of 1010 may be performed in accordance with examples as disclosed herein. In some examples, aspects of the operations of 1010 may be performed by a reference signal component 730 as described with reference to FIG. 7.

At 1015, the method may include transmitting a report indicating a set of power values that are based on the set of quantized values and the set of reference signals received by the UE, each power value of the set of power values associated with a respective beam of the set of beams. The operations of 1015 may be performed in accordance with examples as disclosed herein. In some examples, aspects of the operations of 1015 may be performed by a report component 735 as described with reference to FIG. 7.

FIG. 11 shows a flowchart illustrating a method 1100 that supports beam report enhancements for beam prediction in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving control signaling indicating a set of rules for vector-based beam management reporting for a set of multiple beams. The operations of 1105 may be performed in accordance with examples as disclosed herein. In some examples, aspects of the operations of 1105 may be performed by a rule indication component 740 as described with reference to FIG. 7.

At 1110, the method may include receiving a set of reference signals that correspond to a set of beams of the set of multiple beams, each reference signal of the set of reference signals associated with a beam of the set of multiple beams. The operations of 1110 may be performed in accordance with examples as disclosed herein. In some examples, aspects of the operations of 1110 may be performed by a reference signal component 730 as described with reference to FIG. 7.

At 1115, the method may include transmitting a vector report indicating a set of power values that are based on the set of rules and the set of reference signals received by the UE, each power value of the set of power values associated with a beam of the set of beams. The operations of 1115 may be performed in accordance with examples as disclosed herein. In some examples, aspects of the operations of 1115 may be performed by a report component 735 as described with reference to FIG. 7.

FIG. 12 shows a flowchart illustrating a method 1200 that supports beam report enhancements for beam prediction in accordance with one or more aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include receiving control signaling indicating a set of rules for vector-based beam management reporting for a set of multiple beams. The operations of 1205 may be performed in accordance with examples as disclosed herein. In some examples, aspects of the operations of 1205 may be performed by a rule indication component 740 as described with reference to FIG. 7.

At 1210, the method may include receiving a set of reference signals that correspond to a set of beams of the set of multiple beams, each reference signal of the set of reference signals associated with a beam of the set of multiple beams. The operations of 1210 may be performed in accordance with examples as disclosed herein. In some examples, aspects of the operations of 1210 may be performed by a reference signal component 730 as described with reference to FIG. 7.

At 1215, the method may include transmitting an indication of a set of power values and a set of indices associated with the set of power values, each index of the set of indices associated with a respective power value and corresponding to a respective beam of the set of beams. The operations of 1220 may be performed in accordance with examples as disclosed herein. In some examples, aspects of the operations of 1220 may be performed by a report component 735 as described with reference to FIG. 7.

The following provides an overview of aspects of the present disclosure:

Aspect 1: A method for wireless communication at a UE, comprising: receiving control signaling identifying, for a plurality of beams, a set of quantized values from a plurality of sets of quantized values configured at the UE for beam management reporting for the plurality of beams; receiving a set of reference signals that correspond to a set of beams of the plurality of beams, each reference signal of the set of reference signals associated with a beam of the plurality of beams; and transmitting a report indicating a set of power values that are based at least in part on the set of quantized values and the set of reference signals received by the UE, each power value of the set of power values associated with a respective beam of the set of beams.

Aspect 2: The method of aspect 1, wherein receiving the control signaling identifying the set of quantized values comprises: receiving an indication of a codebook that is one of a plurality of codebooks configured at the UE for beam management reporting for the plurality of beams, wherein the set of quantized values is identified by the codebook.

Aspect 3: The method of aspect 1, wherein receiving the control signaling identifying the set of quantized values comprises: receiving an indication activating a report configuration associated with the set of quantized values, wherein the set of quantized values is identified by the report configuration.

Aspect 4: The method of any of aspects 1 through 3, further comprising: transmitting second control signaling indicating a set of quantized values identified by the UE, wherein receiving the control signaling is based at least in part on the second control signaling.

Aspect 5: The method of aspect 4, wherein the set of quantized values is identified by the UE based at least in part on a measurement accuracy supported by the UE and associated with the set of power values, a power status associated with a battery at the UE, or both.

Aspect 6: The method of any of aspects 1 through 5, further comprising: transmitting second control signaling indicating an error value associated with the set of power values; and receiving third control signaling identifying a second set of quantized values from the plurality of sets of quantized values configured at the UE based at least in part on the indicated error value.

Aspect 7: The method of aspect 6, wherein the error value corresponds to a standard deviation of an error associated with the set of power values, an average error associated with the set of power values, an estimated error for each power value of the set of power values, or any combination thereof.

Aspect 8: The method of any of aspects 1 through 7, further comprising: transmitting second control signaling indicating a quantity of sets of quantized values capable of being supported at the UE; and receiving third control signaling configuring the UE with the plurality of sets of quantized values at least in part in response to the quantity of sets of quantized values capable of being supported at the UE.

Aspect 9: The method of any of aspects 1 through 8, further comprising: transmitting second control signaling indicating a quantization level supported at the UE, a rule for reference signal reporting supported by the UE, or both.

Aspect 10: The method of any of aspects 1 through 9, wherein the set of quantized values is based at least in part on a machine learning model at a network node.

Aspect 11: The method of any of aspects 1 through 10, wherein the set of quantized values comprises a quantization range, a quantization level, a quantity of bits, or any combination thereof.

Aspect 12: A method for wireless communication at a UE, comprising: receiving control signaling indicating a set of rules for vector-based beam management reporting for a plurality of beams; receiving a set of reference signals that correspond to a set of beams of the plurality of beams, each reference signal of the set of reference signals associated with a beam of the plurality of beams; and transmitting a vector report indicating a set of power values that are based at least in part on the set of rules and the set of reference signals received by the UE, each power value of the set of power values associated with a beam of the set of beams.

Aspect 13: The method of aspect 12, wherein transmitting the vector report comprises: transmitting an indication of the set of power values and a set of indices associated with the set of power values, each index of the set of indices associated with a respective power value and corresponding to a respective beam of the set of beams.

Aspect 14: The method of aspect 13, wherein the vector report is transmitted based at least in part on determining that the UE failed to receive a reference signal associated with a beam of the plurality of beams, an index corresponding to the beam comprises a default index and a power value associated with the index comprises a lowest power value of the set of power values.

Aspect 15: The method of aspect 13, further comprising: determining that the UE failed to receive a reference signal associated with a beam of the plurality of beams; and interpolating a power value corresponding to the beam based at least in part on the determination, wherein transmitting the vector report is based at least in part on the interpolation.

Aspect 16: The method of aspect 15, further comprising: receiving second control signaling indicating a function to be used by the UE for interpolating power values, wherein the function is based at least in part on historical power values reported by the UE, and wherein interpolating the power value is based at least in part on the function.

Aspect 17: The method of any of aspects 12 through 16, wherein receiving the control signaling indicating the set of rules for vector-based beam management reporting comprises: receiving an indication of a vector report quantity, wherein the vector report is transmitted based at least in part on the indicated vector report quantity.

Aspect 18: The method of any of aspects 12 through 17, wherein transmitting the vector report comprises: transmitting an indication of the set of power values and a timestamp associated with the set of power values, each power value of the set of power values corresponding to a respective time instance prior to a time instance of the timestamp.

Aspect 19: The method of aspect 18, wherein the control signaling further indicates a quantity of measurements associated with the timestamp, and the set of power values is based at least in part on the indicated quantity.

Aspect 20: The method of any of aspects 18 through 19, further comprising: receiving an indication of a format for vector-based beam management reporting, wherein the vector report further indicates the respective time instance of each power value of the set of power values based at least in part on the format.

Aspect 21: The method of any of aspects 12 through 20, wherein receiving the control signaling indicating the set of rules for vector-based beam management reporting comprises: receiving an indication of an ordering for the set of power values, wherein the vector report indicating the set of power values is transmitted in accordance with the ordering.

Aspect 22: The method of aspect 21, wherein a first power value of the set of power values is indicated using a first quantity of bits and a second power value of the set of power values is indicated using a second quantity of bits based at least in part on the ordering, the first power value being greater than the second power value and the first quantity of bits being greater than the second quantity of bits.

Aspect 23: The method of aspect 22, wherein the second power value corresponds to a power value difference relative to the first power value.

Aspect 24: The method of any of aspects 12 through 23, wherein the vector report comprises an identifier associated with the set of power values, the identifier corresponding to the set of beams.

Aspect 25: An apparatus for wireless communication at a UE, comprising a processor; memory coupled with the processor; and instructions stored in the memory and executable by the processor to cause the apparatus to perform a method of any of aspects 1 through 11.

Aspect 26: An apparatus for wireless communication at a UE, comprising at least one means for performing a method of any of aspects 1 through 11.

Aspect 27: A non-transitory computer-readable medium storing code for wireless communication at a UE, the code comprising instructions executable by a processor to perform a method of any of aspects 1 through 11.

Aspect 28: An apparatus for wireless communication at a UE, comprising a processor; memory coupled with the processor; and instructions stored in the memory and executable by the processor to cause the apparatus to perform a method of any of aspects 12 through 24.

Aspect 29: An apparatus for wireless communication at a UE, comprising at least one means for performing a method of any of aspects 12 through 24.

Aspect 30: A non-transitory computer-readable medium storing code for wireless communication at a UE, the code comprising instructions executable by a processor to perform a method of any of aspects 12 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

one or more processors;

memory coupled with the one or more processors; and instructions stored in the memory and executable by the one or more processors to cause the UE to:

receive control signaling identifying, for a plurality of beams, a set of quantized values from a plurality of sets of quantized values configured at the UE for beam management reporting for the plurality of beams, wherein the control signaling comprises an indication of a codebook that is one of a plurality of codebooks configured at the UE for beam management reporting for the plurality of beams, and wherein the set of quantized values is identified by the codebook and the codebook is based on one or more machine learning models used at the network node for beam predictions or other beam management procedures;

receive a set of reference signals that correspond to a set of beams of the plurality of beams, each reference signal of the set of reference signals associated with a beam of the plurality of beams; and transmit a report indicating a set of power values that are based at least in part on the set of quantized values and the set of reference signals received by the UE, each power value of the set of power values associated with a respective beam of the set of beams.

2. The UE of claim 1, wherein the instructions are further executable by the one or more processors to receive the control signaling identifying the set of quantized values by being executable by the one or more processors to:

receive an indication activating a report configuration associated with the set of quantized values, wherein the set of quantized values is identified by the report configuration.

3. The UE of claim 1, wherein the instructions are further executable by the one or more processors to:

transmit second control signaling indicating a set of quantized values identified by the UE, wherein receiving the control signaling is based at least in part on the second control signaling.

4. The UE of claim 3, wherein the set of quantized values is identified by the UE based at least in part on a measurement accuracy supported by the UE and associated with the set of power values, a power status associated with a battery at the UE, or both.

5. The UE of claim 1, wherein the instructions are further executable by the one or more processors to:

transmit second control signaling indicating an error value associated with the set of power values; and receive third control signaling identifying a second set of quantized values from the plurality of sets of quantized values configured at the UE based at least in part on the indicated error value.

6. The UE of claim 5, wherein the error value corresponds to a standard deviation of an error associated with the set of power values, an average error associated with the set of power values, an estimated error for each power value of the set of power values, or any combination thereof.

7. The UE of claim 1, wherein the instructions are further executable by the one or more processors to:

transmit second control signaling indicating a quantity of sets of quantized values capable of being supported at the UE; and receive third control signaling configuring the UE with the plurality of sets of quantized values at least in part in response to the quantity of sets of quantized values capable of being supported at the UE.

8. The UE of claim 1, wherein the instructions are further executable by the one or more processors to:

transmit second control signaling indicating a quantization level supported at the UE, a rule for reference signal reporting supported by the UE, or both.

9. The UE of claim 1, wherein the set of quantized values comprises a quantization range, a quantization level, a quantity of bits, or any combination thereof.

10. A method for wireless communication at a user equipment (UE), comprising:

receiving control signaling identifying, for a plurality of beams, a set of quantized values from a plurality of sets of quantized values configured at the UE for beam management reporting for the plurality of beams, wherein the control signaling comprises an indication of a codebook that is one of a plurality of codebooks configured at the UE for beam management reporting for the plurality of beams, and wherein the set of quantized values is identified by the codebook and the codebook is based on one or more machine learning models used at the network node for beam predictions or other beam management procedures;

receiving a set of reference signals that correspond to a set of beams of the plurality of beams, each reference signal of the set of reference signals associated with a beam of the plurality of beams; and transmitting a report indicating a set of power values that are based at least in part on the set of quantized values and the set of reference signals received by the UE, each power value of the set of power values associated with a respective beam of the set of beams.

11. The method of claim 10, wherein receiving the control signaling identifying the set of quantized values comprises:

receiving an indication activating a report configuration associated with the set of quantized values, wherein the set of quantized values is identified by the report configuration.

12. The method of claim 10, further comprising:

transmit second control signaling indicating a set of quantized values identified by the UE, wherein receiving the control signaling is based at least in part on the second control signaling.

13. The method of claim 12, wherein the set of quantized values is identified by the UE based at least in part on a measurement accuracy supported by the UE and associated with the set of power values, a power status associated with a battery at the UE, or both.

14. The method of claim 10, further comprising:

transmitting second control signaling indicating an error value associated with the set of power values; and receiving third control signaling identifying a second set of quantized values from the plurality of sets of quantized values configured at the UE based at least in part on the indicated error value.

15. The method of claim 14, wherein the error value corresponds to a standard deviation of an error associated with the set of power values, an average error associated with the set of power values, an estimated error for each power value of the set of power values, or any combination thereof.

16. The method of claim 10, further comprising:

transmitting second control signaling indicating a quantity of sets of quantized values capable of being supported at the UE; and receiving third control signaling configuring the UE with the plurality of sets of quantized values at least in part in response to the quantity of sets of quantized values capable of being supported at the UE.

17. The method of claim 10, further comprising:

transmitting second control signaling indicating a quantization level supported at the UE, a rule for reference signal reporting supported by the UE, or both.

18. The method of claim 10, wherein the set of quantized values comprises a quantization range, a quantization level, a quantity of bits, or any combination thereof.

19. A user equipment (UE) for wireless communication, comprising:

means for receiving control signaling identifying, for a plurality of beams, a set of quantized values from a plurality of sets of quantized values configured at the UE for beam management reporting for the plurality of beams, wherein the control signaling comprises an indication of a codebook that is one of a plurality of codebooks configured at the UE for beam management reporting for the plurality of beams, and wherein the set of quantized values is identified by the codebook and the codebook is based on one or more machine learning models used at the network node for beam predictions or other beam management procedures;

means for receiving a set of reference signals that correspond to a set of beams of the plurality of beams, each reference signal of the set of reference signals associated with a beam of the plurality of beams; and means for transmitting a report indicating a set of power values that are based at least in part on the set of quantized values and the set of reference signals received by the UE, each power value of the set of power values associated with a respective beam of the set of beams.

20. The UE of claim 19, wherein the means for receiving the control signaling identifying the set of quantized values further comprise:

means for receiving an indication activating a report configuration associated with the set of quantized values, wherein the set of quantized values is identified by the report configuration.

21. The UE of claim 19, further comprising:

means for transmitting second control signaling indicating a set of quantized values identified by the UE, wherein receiving the control signaling is based at least in part on the second control signaling.

22. A non-transitory computer-readable medium storing code for wireless communication, the code comprising instructions executable by one or more processors to:

receive control signaling identifying, for a plurality of beams, a set of quantized values from a plurality of sets of quantized values configured at the non-transitory computer-readable medium for beam management reporting for the plurality of beams, wherein the control signaling comprises an indication of a codebook that is one of a plurality of codebooks configured at the UE for beam management reporting for the plurality of beams, and wherein the set of quantized values is identified by the codebook and the codebook is based on one or more machine learning models used at the network node for beam predictions or other beam management procedures;

receive a set of reference signals that correspond to a set of beams of the plurality of beams, each reference signal of the set of reference signals associated with a beam of the plurality of beams; and transmit a report indicating a set of power values that are based at least in part on the set of quantized values and the set of reference signals received by the non-transitory computer-readable medium, each power value of the set of power values associated with a respective beam of the set of beams.

23. The non-transitory computer-readable medium of claim 22, wherein the instructions to receive the control signaling identifying the set of quantized values are further executable by the one or more processors to:

receive an indication activating a report configuration associated with the set of quantized values, wherein the set of quantized values is identified by the report configuration.

24. The non-transitory computer-readable medium of claim 22, wherein the instructions are further executable by the one or more processors to:

transmit second control signaling indicating a set of quantized values identified by the non-transitory computer-readable medium, wherein receiving the control signaling is based at least in part on the second control signaling.

* * * * *